(12) United States Patent
Yan et al.

(10) Patent No.: US 11,962,527 B2
(45) Date of Patent: Apr. 16, 2024

(54) COMMUNICATION METHOD AND APPARATUS

(71) Applicant: HUAWEI TECHNOLOGIES CO., LTD., Shenzhen (CN)

(72) Inventors: Min Yan, Shenzhen (CN); Guangjian Wang, Chengdu (CN); Wei Lin, Shenzhen (CN); Mengyao Ma, Shenzhen (CN); Yanchun Li, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 428 days.

(21) Appl. No.: 17/241,689

(22) Filed: Apr. 27, 2021

(65) Prior Publication Data

US 2021/0250147 A1   Aug. 12, 2021

Related U.S. Application Data

(63) Continuation of application No. PCT/CN2019/113128, filed on Oct. 24, 2019.

(30) Foreign Application Priority Data

Oct. 29, 2018 (CN) .......................... 201811268162.8

(51) Int. Cl.
 *H04L 5/00* (2006.01)
 *H04L 27/26* (2006.01)
(52) U.S. Cl.
 CPC ...... *H04L 5/0048* (2013.01); *H04L 27/26134* (2021.01)
(58) Field of Classification Search
 CPC .............. H04L 5/0048; H04L 27/26134
 See application file for complete search history.

(56) References Cited

U.S. PATENT DOCUMENTS

2009/0285327 A1   11/2009  Iwai et al.
2013/0215814 A1*  8/2013  Lee .................. H04W 4/70
                                                 370/312
2019/0132247 A1*  5/2019  Zhang ............... H04L 5/0048

FOREIGN PATENT DOCUMENTS

CN    101997803 A    3/2011
CN    107547094 A    1/2018
(Continued)

OTHER PUBLICATIONS

IEEE P802.11ay /D2.0, Jul. 2018, Draft Standard for Information Technology-10 Telecommunications and Information Exchange 11 Between Systems-Local and Metropolitan Area 12 Networks-Specific Requirements-Part 11: Wireless 13 LAN Medium Access Control (MAC) and Physical Layer 14 (PHY) Specifications-15, Amendment 7: Enhanced throughput for operation in 16 license-exempt bands above 45 GHZ, 673 pages.
(Continued)

*Primary Examiner* — Brian P Cox
(74) *Attorney, Agent, or Firm* — HAUPTMAN HAM, LLP

(57) ABSTRACT

A communications apparatus includes a processor configured to generate a radio frame. The radio frame comprises a data block. The data block comprises a plurality of N pilot blocks, a plurality of M sub-data blocks, and one guard interval (GI). Every two N pilot blocks of the plurality of N pilot blocks are not adjacent. The GI is located at a tail end of the data block, 4≤N≤8, N is an integer, M≥N−1, and M is an integer. The communications apparatus also includes transceiver configured to send the radio frame to a receiver.

20 Claims, 22 Drawing Sheets

(56) References Cited

FOREIGN PATENT DOCUMENTS

| CN | 107548541 | A  | 1/2018 |
| CN | 107925424 | A  | 4/2018 |
| WO | 2009045135 | A1 | 4/2009 |
| WO | 2018013639 | A2 | 1/2018 |

OTHER PUBLICATIONS

IEEE Std 802.11ad -2012, IEEE Standard for Information technology-Telecommunications and information exchange between systems Local and metropolitan area networks-Specific requirements, Part 11: Wireless LAN Medium Access Control (MAC) and Physical Layer (PHY) Specifications, Amendment 3: Enhancements for Very High Throughput in the 60 GHz Band, Approved Oct. 19, 2012, total 628 pages.

International Search Report issued in corresponding International Application No. PCT/CN2019/113128, dated Jan. 2, 2020, pp. 1-10.

Chinese Office Action issued in corresponding Chinese Application No. 201811268162.8, dated Apr. 29, 2022, pp. 1-11.

\* cited by examiner

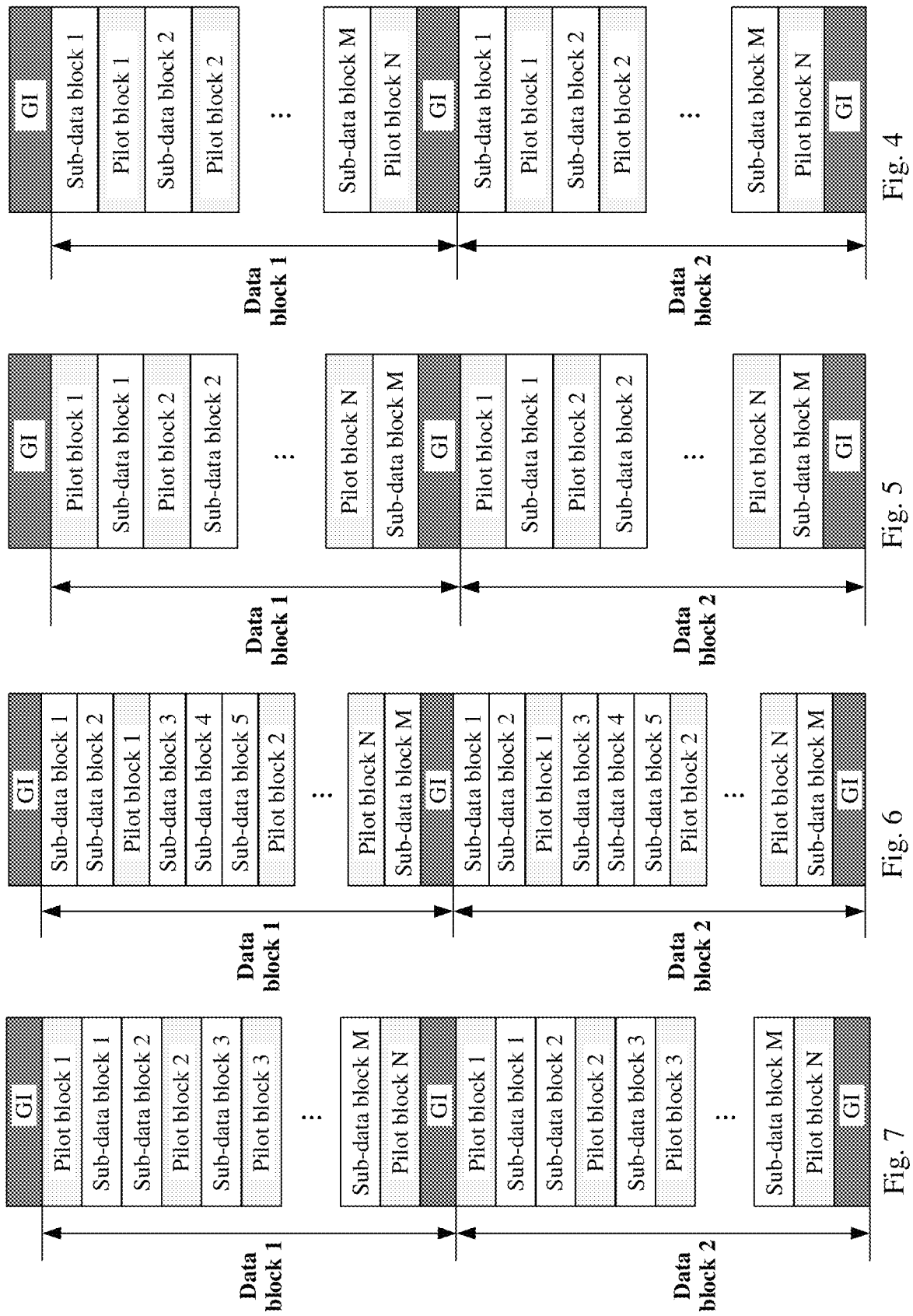

COMMUNICATION METHOD AND APPARATUS

CROSS-REFERENCE TO RELATED APPLICATIONS

This application is a continuation of International Application No. PCT/CN2019/113128, filed on Oct. 24, 2019, which claims priority to Chinese Patent Application No. 201811268162.8, filed on Oct. 29, 2018. The disclosures of the aforementioned applications are hereby incorporated by reference in their entireties.

TECHNICAL FIELD

This application relates to the communications field, and in particular, to a communication method and apparatus.

BACKGROUND

Wireless communication in a high frequency band (e.g., high-frequency wireless communication) is one of hot research topics of current fifth generation (5G) and wireless-fidelity (Wi-Fi) communications systems. IEEE 802.11ad/ay is a high-frequency wireless communication standard applied to wireless local area network (WLAN) communication. High-frequency communication in a WLAN system works in a 60-GHz millimeter-wave band, that is, millimeter-wave communication. In the millimeter-wave communication, phase noise has relatively great impact on system performance. Especially in a high-bandwidth and in a high-order modulation system, high-frequency communication has an extremely high requirement on an error vector magnitude EVM), and phase noise has more significant impact on system performance.

For a communications system supporting the 802.11ad/ay standard, in a data transmission process, frames at single carrier (SC) physical layers (PHY) of different bonded channels (CB) are usually formed by a plurality of data blocks and a plurality of guard intervals (GI). There is one GI at each of a head end and a tail end of one data block. Currently, phase estimation and compensation are usually performed by using GIs at both a head end and a tail end of each data block. However, due to a limitation of an existing frame format, a phase error of an obtained compensated data part is very large, and impact of phase noise on system performance cannot be well reduced.

SUMMARY

This application provides a communication method and apparatus, to reduce impact of phase noise on system performance.

According to a first aspect, this application provides a communication method. The method includes: After generating a radio frame, a transmitter sends the radio frame to a receiver; and after receiving the radio frame from the transmitter, the receiver parses the radio frame, where the radio frame includes a data block, and the data block includes N pilot blocks, M sub-data blocks, and one guard interval GI, where every two of the N pilot blocks are not adjacent, the GI is located at a tail end of the data block, $4 \leq N \leq 8$ and N is an integer, and $M \geq N-1$ and M is an integer.

According to the method, in data transmission of wireless communication, the receiver may perform phase estimation and compensation by using pilot blocks at two ends of a sub-data block. In this way, a length of a sub-data block between two adjacent pilot blocks is small, and therefore impact of phase noise on system performance may be reduced.

In a possible design, the pilot block is used for phase estimation and compensation. In this way, channel equalization can be implemented.

In a possible design, the transmitter is an access point, and the receiver is a station; or the transmitter is a station, and the receiver is an access point.

In a possible design, each of the N pilot blocks includes P pilots, where $4 \leq P \leq 8$ and P is an integer. In this way, a relatively good effect can be achieved when the impact of the phase noise on the system performance is reduced.

In a possible design, every two of the M sub-data blocks are not adjacent. In this way, the sub-data blocks may be evenly distributed, and a relatively good effect can be achieved when the impact of the phase noise on the system performance is reduced.

In a possible design, the N pilot blocks have a same length. In this way, the pilot blocks may be evenly distributed, pilot overheads are reduced, average system performance is improved, and a relatively good effect can be achieved when the impact of the phase noise on the system performance is reduced.

In a possible design, the M sub-data blocks have a same length. In this way, average system performance may be improved, and a relatively good effect can be achieved when the impact of the phase noise on the system performance is reduced.

In a possible design, the data block includes 512 time domain sampling points, and the data block includes four pilot blocks, four sub-data blocks, and one GI, where each pilot block includes four pilots, each sub-data block includes 112 time domain sampling points, and the GI includes 48 time domain sampling points; or each pilot block includes four pilots, each sub-data block includes 109 time domain sampling points, and the GI includes 60 time domain sampling points; or each pilot block includes eight pilots, each sub-data block includes 106 time domain sampling points, and the GI includes 56 time domain sampling points.

According to the method, a relatively good effect can be achieved when the impact of the phase noise on the system performance is reduced.

In a possible design, the data block includes 1024 time domain sampling points, and the data block includes four pilot blocks, four sub-data blocks, and one GI, where each pilot block includes four pilots, each sub-data block includes 224 time domain sampling points, and the GI includes 112 time domain sampling points; or each pilot block includes four pilots, each sub-data block includes 221 time domain sampling points, and the GI includes 124 time domain sampling points; or each pilot block includes eight pilots, each sub-data block includes 218 time domain sampling points, and the GI includes 120 time domain sampling points.

According to the method, a relatively good effect can be achieved when the impact of the phase noise on the system performance is reduced.

In a possible design, the data block includes 512 time domain sampling points, and the data block includes four sub-data blocks, three pilot blocks, and one GI, where each pilot block includes four pilots, each sub-data block includes 112 time domain sampling points, and the GI includes 52 time domain sampling points; or each pilot block includes four pilots, each sub-data block includes 109 time domain sampling points, and the GI includes 64 time domain sampling points; or each pilot block includes eight pilots, each sub-data block includes 106 time domain sampling points, and the GI includes 64 time domain sampling points.

According to the method, a relatively good effect can be achieved when the impact of the phase noise on the system performance is reduced.

In a possible design, the data block includes 1024 time domain sampling points, and the data block includes four sub-data blocks, three pilot blocks, and one GI, where each pilot block includes four pilots, each sub-data block includes 224 time domain sampling points, and the GI includes 116 time domain sampling points; or each pilot block includes four pilots, each sub-data block includes 221 time domain sampling points, and the GI includes 128 time domain sampling points; or each pilot block includes eight pilots, each sub-data block includes 218 time domain sampling points, and the GI includes 128 time domain sampling points.

According to the method, a relatively good effect can be achieved when the impact of the phase noise on the system performance is reduced.

According to a second aspect, this application further provides a communications apparatus. The communications apparatus has a function of implementing the transmitter in the method example according to the first aspect. The function may be implemented by hardware, or may be implemented by hardware executing corresponding software. The hardware or software includes one or more modules corresponding to the foregoing function.

In a possible design, a structure of the communications apparatus includes a processing unit and a sending unit. The units may perform corresponding functions in the method example according to the first aspect. For details, refer to the detailed descriptions in the method example. Details are not described herein again.

In a possible design, the structure of the communications apparatus includes a transceiver and a processor. Optionally, the communications apparatus may further include a memory. The transceiver is configured to: send a radio frame, and communicate and interact with another device (for example, a receiver) in a communications system. The processor is configured to support the transmitter in performing a corresponding function in the method according to the first aspect. The memory is coupled to the processor and stores a program instruction and data for the communications apparatus.

According to a third aspect, this application further provides a communications apparatus. The communications apparatus has a function of implementing the receiver in the method example according to the first aspect. The function may be implemented by hardware, or may be implemented by hardware executing corresponding software. The hardware or software includes one or more modules corresponding to the foregoing function.

In a possible design, a structure of the communications apparatus includes a receiving unit and a processing unit. The units may perform corresponding functions in the method example according to the first aspect. For details, refer to the detailed descriptions in the method example. Details are not described herein again.

In a possible design, the structure of the communications apparatus includes a transceiver and a processor. Optionally, the communications apparatus may further include a memory. The transceiver is configured to: receive a radio frame, and communicate and interact with another device (for example, a transmitter) in a communications system. The processor is configured to support the receiver in performing a corresponding function in the method according to the first aspect. The memory is coupled to the processor and stores a program instruction and data for the communications apparatus.

According to a fourth aspect, this application further provides a communications system. The communications system may include at least one transmitter, at least one receiver, and the like mentioned above.

According to a fifth aspect, this application further provides a computer storage medium. The computer storage medium stores computer-executable instructions; and when the computer-executable instructions are invoked by a computer, the computer is enabled to perform the method according to any one of the foregoing methods.

According to a sixth aspect, this application further provides a computer program product including an instruction. When the computer program product runs on a computer, the computer is enabled to perform the method according to any one of the foregoing aspects.

According to a seventh aspect, this application further provides a chip system. The chip system includes a processor, configured to support the communications apparatus in implementing a function in the first aspect or the second aspect, for example, generating or processing the radio frame (or information, data, or the like) in the foregoing method. In a possible design, the chip system further includes a memory, and the memory is configured to store a program instruction and data for the communications apparatus. The chip system may include a chip, or may include a chip and another discrete component.

BRIEF DESCRIPTION OF DRAWINGS

FIG. 4 is a schematic diagram of a format of a radio frame according to an embodiment of this application;

FIG. 5 is a schematic diagram of a format of another radio frame according to an embodiment of this application;

FIG. 6 is a schematic diagram of a format of another radio frame according to an embodiment of this application;

FIG. 7 is a schematic diagram of a format of another radio frame according to an embodiment of this application;

DETAILED DESCRIPTION OF EMBODIMENTS

The following further describes this application in detail with reference to the accompanying drawings.

Embodiments of this application provide a communication method and apparatus, to reduce impact of phase noise on system performance. The method and the apparatus in this application are based on a same inventive concept. The method and the apparatus have similar problem resolving principles. Therefore, for implementation of the apparatus and the method, mutual reference may be made to each other. Details of repeated parts are not described.

The following describes some terms in this application, to facilitate understanding of a person skilled in the art.

(1) A transmitter is a wireless communications apparatus having a wireless sending function, may further have a wireless receiving function, and is a device for generating and sending a radio frame. The transmitter may be an access point (AP) or a station (STA) in a WLAN communications system, or may be a base station or a terminal device in a cellular communications system. When the transmitter is an access point, the transmitter may be, but is not limited to, a wireless fidelity (Wi-Fi) router or the like, and may support parallel uplink transmission of a plurality of stations. When the transmitter is a station, the transmitter may be, but is not limited to, a device having a wireless communication function, such as a computer, a notebook computer, a mobile phone, or virtual reality (VR) glasses.

(2) A receiver is a wireless communications apparatus having a wireless receiving function, may further have a wireless sending function, and is a device for receiving and parsing a radio frame. The receiver may be an AP or a STA in a WLAN communications system, or may be a base station or a terminal device in a cellular communications system. When the transmitter is an AP, the receiver is a STA; or when the transmitter is a STA, the receiver is an AP. In this application, when the receiver is an AP, the AP may be the same as the AP in (1); or when the receiver is a STA, the STA may be the same as the STA in (1). Details are not described herein again.

In this application, "at least one" refers to one or more, and "a plurality of" refers to two or more. The character "I" generally represents an "or" relationship between associated objects.

To describe technical solutions in the embodiments of this application more clearly, the following describes the communication method and apparatus according to the embodiments of this application in detail with reference to the accompanying drawings.

Figure 1:
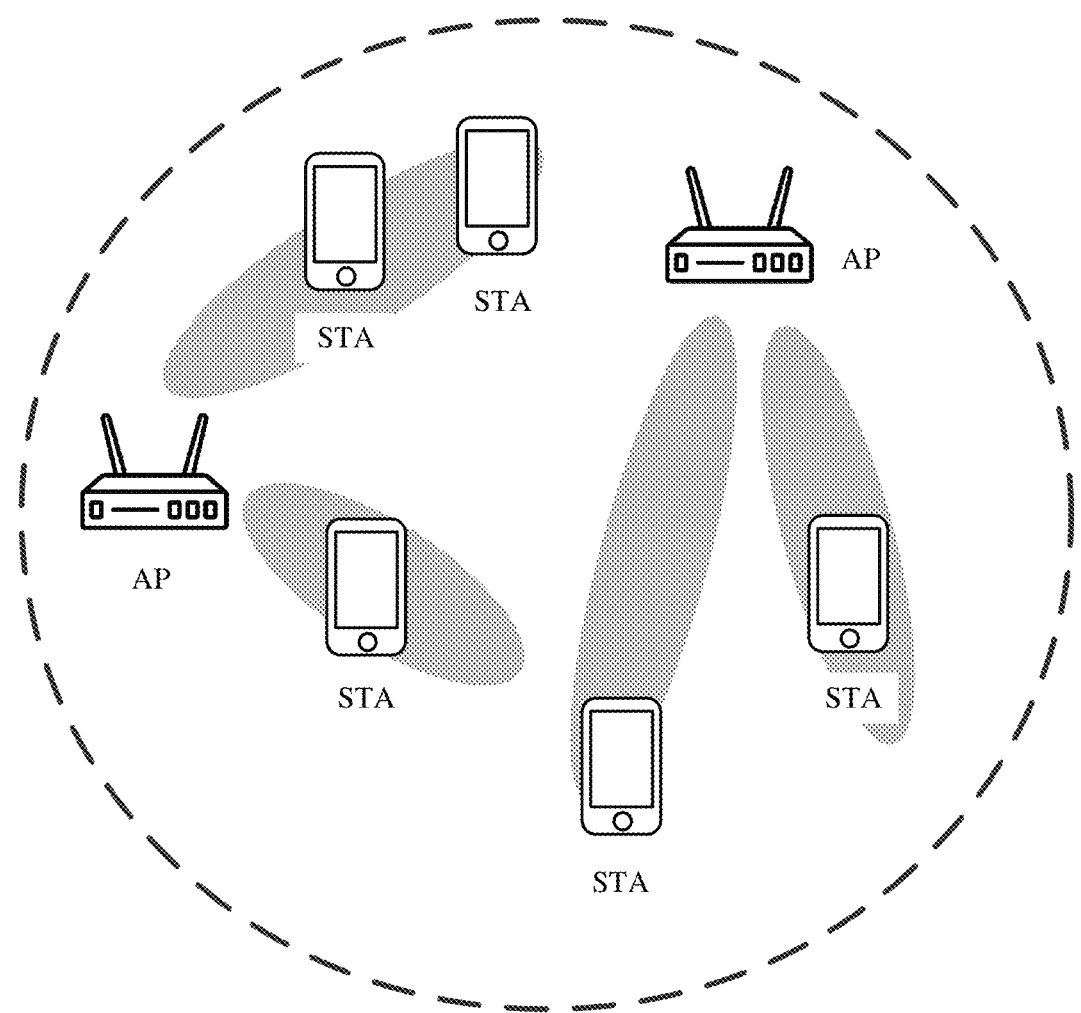
FIG. 1 is an architectural diagram of a communications system according to an embodiment of this application.

The communication method provided in the embodiments of this application may be used in, but not limited to, a wireless local area network (WLAN) scenario in high-frequency wireless communication. For example, FIG. 1 shows an architecture of a communications system that is in a possible application scenario and to which the communication method provided in the embodiments of this application is applicable. The architecture of the communications system may include at least one AP and a plurality of STAs, and the at least one AP may perform wireless communication with the plurality of STAs. Details are as follows:

The at least one AP each is an apparatus that is deployed in a wireless communications network and that provides a wireless communication function for a station associated with the AP. The AP may be used as a hub of the communications system, and may be a base station, a router, a gateway, a repeater, a communications server, a switch, a bridge, or the like. The base station may include a macro base station, a micro base station, a relay station, and the like in various forms. For example, the AP in FIG. 1 is merely shown as a (Wi-Fi) router. Certainly, the AP may alternatively be another AP device. This is not shown one by one in this application. The plurality of STAs may be various devices having a wireless communication function, such as user terminals, user apparatuses, access apparatuses, subscriber stations, subscriber units, mobile stations, user agents, user devices, or other devices. The user terminal may include various devices having the wireless communication function, such as handheld devices, vehicle-mounted devices, wearable devices, computing devices, or other processing devices connected to wireless modems, and include various forms of user equipment (UE), mobile stations (MS), terminals, terminal devices, portable communications devices, handheld devices, portable computing devices, entertainment devices, game devices or systems, global positioning system devices, any other appropriate devices configured to perform network communication via wireless media, or the like. For example, in FIG. 1, mobile phones are used as examples to show the plurality of STAs. Each AP supports parallel uplink transmission of a plurality of STAs.

Figure 2:
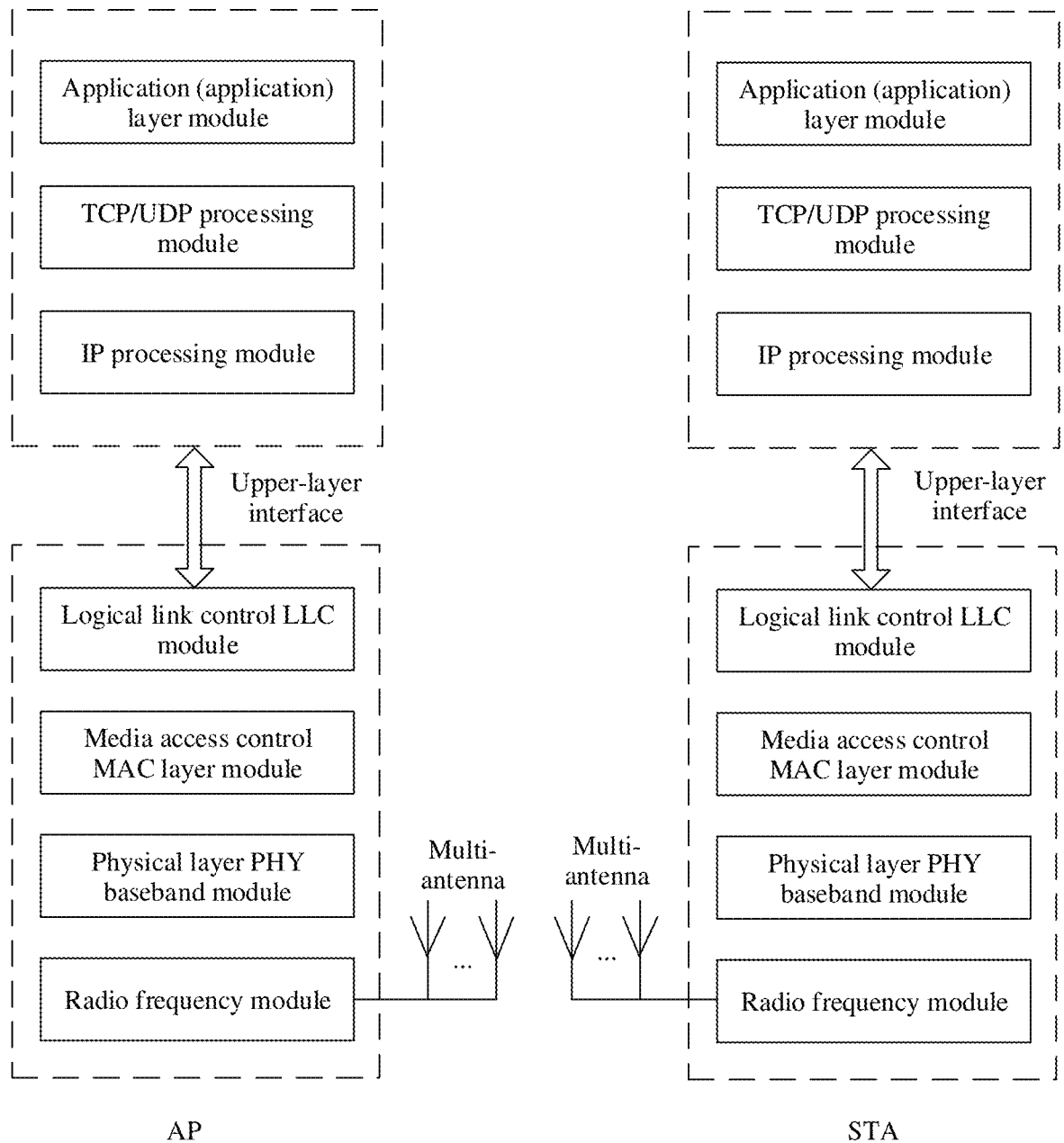
FIG. 2 is an example diagram of internal structures of an AP and a STA according to an embodiment of this application.

In this embodiment of this application, wireless communication is performed between the AP and the STA, and the AP and the STA separately generate radio frames in a communication process and interact with each other. For example, FIG. 2 shows an example of internal structures of an AP and a STA. A result of communication between the AP and the STA may be used by a baseband module to adjust a radio frequency and control an antenna, so as to implement multi-user multiple-input multiple-output (MU MIMO) transmission.

A communication negotiation procedure protocol part in a wireless communication process mainly relates to a logical link control (LLC) module and a media access control (MAC) layer module in FIG. 2. Antenna control and adjustment and beamforming mainly relate to a physical layer (PHY) baseband module, a radio frequency (RF) module, and an antenna part. The antenna and the radio frequency module may be fixedly connected in a one-to-one manner, or may be connected in a switchable manner.

The PHY baseband module mainly implements a signal processing function, for example, performs digital-to-analog or analog-to-digital conversion, and sends and receives signals. The PHY baseband module may generate, through signal processing, a reference signal (e.g., a radio frame) for measurement, and the reference signal is received, so that signal strength can be estimated, or channel quality, a channel coefficient, or the like can be estimated. The PHY baseband module may further modulate a signal to a target frequency band or demodulate a received signal. The PHY baseband module is further connected to upper-layer protocol modules (for example, the LLC module and the MAC layer module), performs packet encapsulation and decapsulation, and executes a packet receiving and sending sequence stipulated in a protocol, including sending a training frame, receiving a training frame, replying with a response frame, and the like.

The radio frequency module is connected to the PHY baseband module, and the radio frequency module is configured to: convert the reference signal (which may also be referred to as a baseband signal) generated by the PHY baseband module into a signal in a target spectrum (for example, a millimeter-wave band or another frequency band), or convert a signal in the target spectrum into a baseband signal and transmit the baseband signal to the PHY baseband module.

A multi-antenna is configured to send and propagate, or receive and capture the signal in the target spectrum in a specific antenna (or beam) direction.

It should be noted that the architecture of the communications system shown in FIG. 1 is not limited to including only the devices shown in the figure, and may further include another device not shown in the figure. Details are not described herein in this application one by one.

It should be noted that the communications system shown in FIG. 1 is merely an example, and does not constitute a limitation on a communications system to which the embodiments of this application are applicable. The architecture of the communications system shown in FIG. 1 may be a 5G system architecture. The method in the embodiments of this application may be further applicable to various future communications systems, for example, a 6G or another communications network. The communication method provided in the embodiments of this application is applicable to an IEEE 802.11 system standard, for example, the IEEE 802.11ad/ay standard, a next-generation standard of the IEEE 802.11ad/ay standard, or a next-generation standard of the next-generation standard of the IEEE 802.11ad/ay standard. This is not limited in this application.

Figure 3:
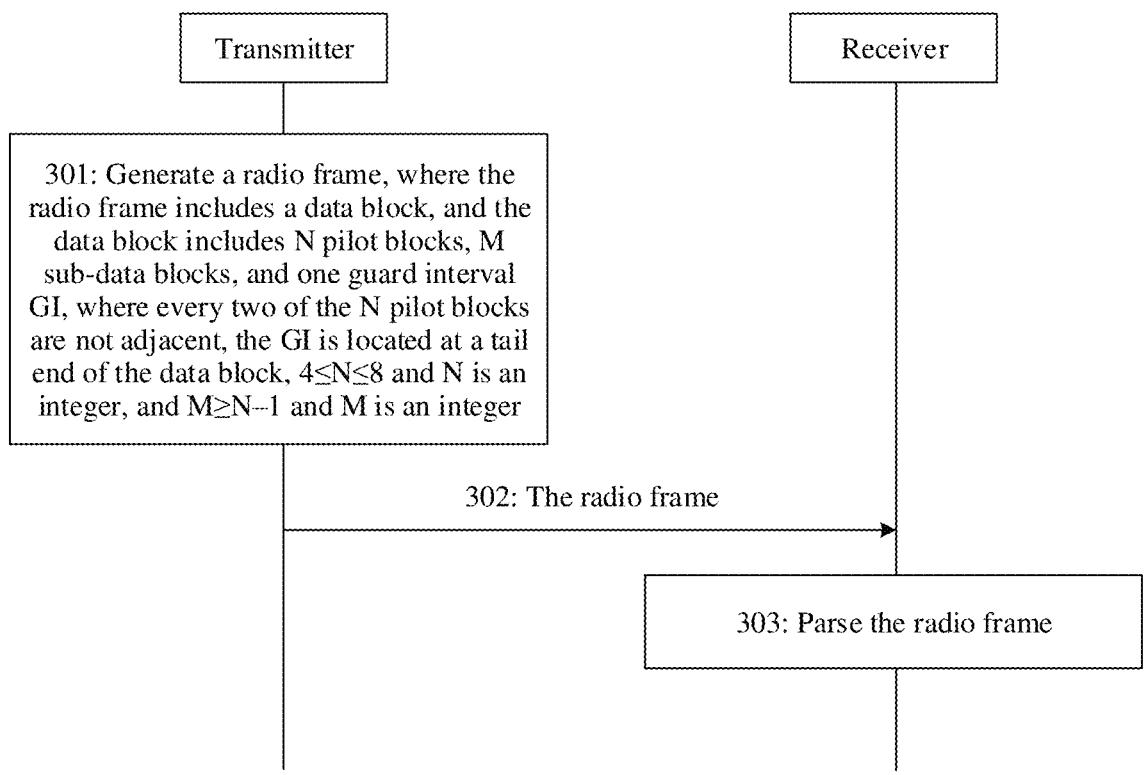
FIG. 3 is a flowchart of a communication method according to an embodiment of this application.

A communication method provided in an embodiment of this application is applicable to the communications system shown in FIG. 1. Referring to FIG. 3, an example procedure of the method may include the following steps.

Step 301: A transmitter generates a radio frame, where the radio frame includes a data block, and the data block includes N pilot blocks, M sub-data blocks, and one guard interval GI, where every two of the N pilot blocks are not adjacent, the GI is located at a tail end of the data block, $4 \leq N \leq 8$ and N is an integer, and $M \geq N-1$ and M is an integer.

In an implementation, the pilot block is used for phase estimation and compensation. In this way, a plurality of pilot blocks are inserted into one data block, and phase estimation and compensation may be performed by using pilot blocks at two ends of a sub-data block. In this way, a length of a sub-data block between two adjacent pilot blocks is small, and therefore impact of phase noise on system performance may be reduced.

The GI is also used for phase estimation and compensation. For example, that the GI is located at a tail end of the data block may be understood as that the GI is located after the N pilot blocks and the M sub-data blocks.

That two pilot blocks are not adjacent may be understood as that the two pilot blocks are separated by at least one sub-data block.

Step 302: The transmitter sends the radio frame to a receiver.

Step 303: The receiver parses the radio frame.

The receiver may perform phase estimation and compensation based on the pilot block, and therefore parse the radio frame. Because an interval between pilot blocks is small, the impact of the phase noise on the system performance may be reduced.

In a possible case, the transmitter is an AP in the communications system shown in FIG. 1, and the receiver is a STA in the communications system shown in FIG. 1. In another possible case, the transmitter is a STA in the communications system shown in FIG. 1, and the receiver is an AP in the communications system shown in FIG. 1.

It should be understood that any radio frame may include at least one data block, and each data block may comply with a structure of the data block provided in this embodiment of this application. In an optional implementation, the radio frame may be constituted in the following manner: A head end of the radio frame includes one GI, where the GI is referred to as a head-end GI for ease of description; and the head-end GI is sequentially followed by at least one data block, where a length of the head-end GI of the radio frame and a length of a GI included in each data block may be the same or may be different. This is not limited in this application. It should be noted that a radio frame subsequently involved in this application may be understood as a radio frame constituted in the foregoing constitution manner.

In one data block of the radio frame, any two sub-data blocks may be adjacent or may not be adjacent, and sub-data blocks that are not adjacent may be separated by an inserted pilot block. For example, a schematic diagram of a format (or frame format) of the radio frame may be shown in FIG. 4, FIG. 5, FIG. 6, or FIG. 7. Data blocks such as a data block 1 and a data block 2 in the radio frame in any one of FIG. 4, FIG. 5, FIG. 6, or FIG. 7 are constituted in a same manner. Certainly, the format of the radio frame shown in the foregoing figure is merely an illustration of a possible case, and may alternatively be another format. Examples are not listed one by one herein in this application. It should be noted that, for ease of illustration, in the schematic diagrams of the format of the radio frame in this embodiment of this application, that is, in FIG. 4, FIG. 5, FIG. 6, or FIG. 7, an example in which the radio frame includes two data blocks is used for illustration. However, it should be understood that in addition to only including two data blocks, the radio frame may alternatively include one or more (for example, three or four) data blocks. Examples are not listed one by one herein in this application.

In an optional implementation, each of the N pilot blocks may include P pilots, where $4 \leq P \leq 8$ and P is an integer. In this way, a relatively good effect can be achieved when the impact of the phase noise on the system performance is reduced.

In a possible design, every two of the M sub-data blocks may not be adjacent. In this case, in one data block, any two adjacent sub-data blocks are separated by one pilot block.

For example, for a format of every two sub-data blocks in the radio frame, refer to structures of the sub-data block 1 and the sub-data block 2 in FIG. 4 and FIG. 5.

In an example implementation, the N pilot blocks have a same length. For example, each of the N pilot blocks may include four pilots, five pilots, or eight pilots. A length of one pilot may be understood as that one pilot includes one time domain sampling point. It should be noted that in this embodiment of this application, a unit length of an involved pilot is one time domain sampling point. In this way, the impact of the phase noise on the system performance can be much smaller.

In an example implementation, the M sub-data blocks may have a same length. In this way, it is equivalent that the sub-data blocks in the data block are evenly distributed, so that a relatively good effect can be achieved in terms of reducing the impact of the phase noise on the system performance.

In an optional implementation, a length of the data block may be set to a corresponding fast Fourier transformation (FFT) length during data transmission. For example, the length of the data block may be understood as that the data block includes 512 time domain sampling points or 1024 time domain sampling points. For example, when a channel bandwidth is 2.16 gigahertz (GHz), the length of the data block is usually 512 time domain sampling points, but is not limited to that the data block includes 512 time domain sampling points. For example, the data block may alternatively include 1024 time domain sampling points. For example, when a channel bandwidth is 2.16 GHz, and one data block includes 1024 time domain sampling points, frame structures in this embodiment of this application may also be used, for example, frame structures shown in FIG. 12 to FIG. 15 or FIG. 20 to FIG. 23. When a channel bandwidth is 4.32 GHz, the length of the data block is usually 1024 time domain sampling points, but is not limited to that the data block includes 1024 time domain sampling points. For example, the data block may include 512 time domain sampling points. For example, when a channel bandwidth is 4.32 GHz, and one data block includes 512 time domain sampling points, frame structures in this embodiment of this application may also be used, for example, frame structures shown in FIG. 8 to FIG. 11 or FIG. 16 to FIG. 19.

Based on the foregoing descriptions, the following describes the structure of the data block by using some examples (where in each example, that the radio frame includes three data blocks is used as an example for description).

Example 1

Figure 8:
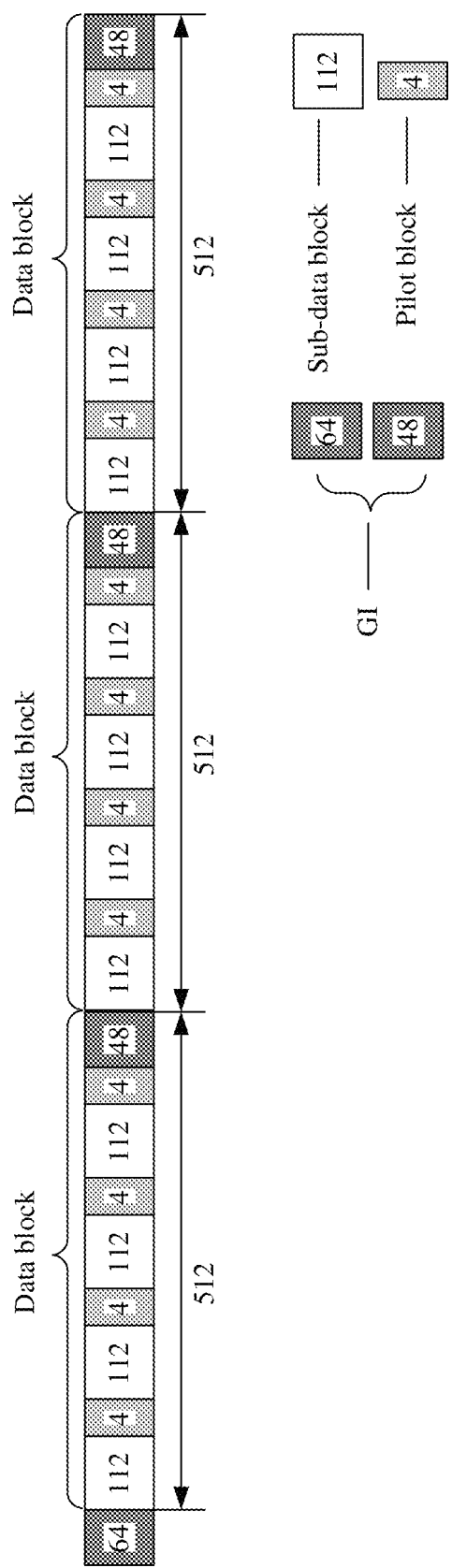
FIG. 8 is a schematic diagram of a format of another radio frame according to an embodiment of this application.

In a schematic diagram, shown in FIG. 8, of a format of the radio frame, the data block includes 512 time domain sampling points, the data block includes four pilot blocks, four sub-data blocks, and one GI, each pilot block includes four pilots, each sub-data block includes 112 time domain sampling points, and the GI includes 48 time domain sampling points. In FIG. 8, in addition to including 64 time domain sampling points, a head-end GI of the radio frame may alternatively include another quantity of time domain sampling points, for example, may include 48 time domain sampling points or 52 time domain sampling points. This is not limited in this application.

Example 2

Figure 9:
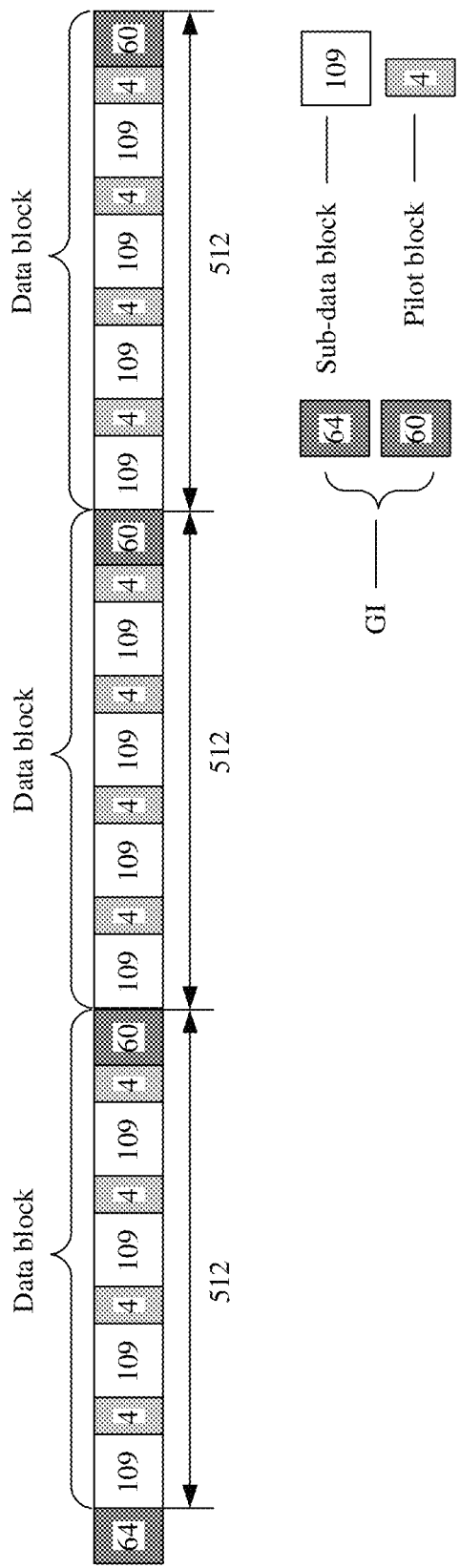
FIG. 9 is a schematic diagram of a format of another radio frame according to an embodiment of this application.

In a schematic diagram, shown in FIG. 9, of a format of the radio frame, the data block includes 512 time domain sampling points, the data block includes four pilot blocks, four sub-data blocks, and one GI, each pilot block includes four pilots, each sub-data block includes 109 time domain sampling points, and the GI includes 60 time domain sampling points. In FIG. 9, in addition to including 64 time domain sampling points, a head-end GI of the radio frame may alternatively include another quantity of time domain sampling points, for example, may include 60 time domain sampling points. This is not limited in this application.

Example 3

Figure 10:
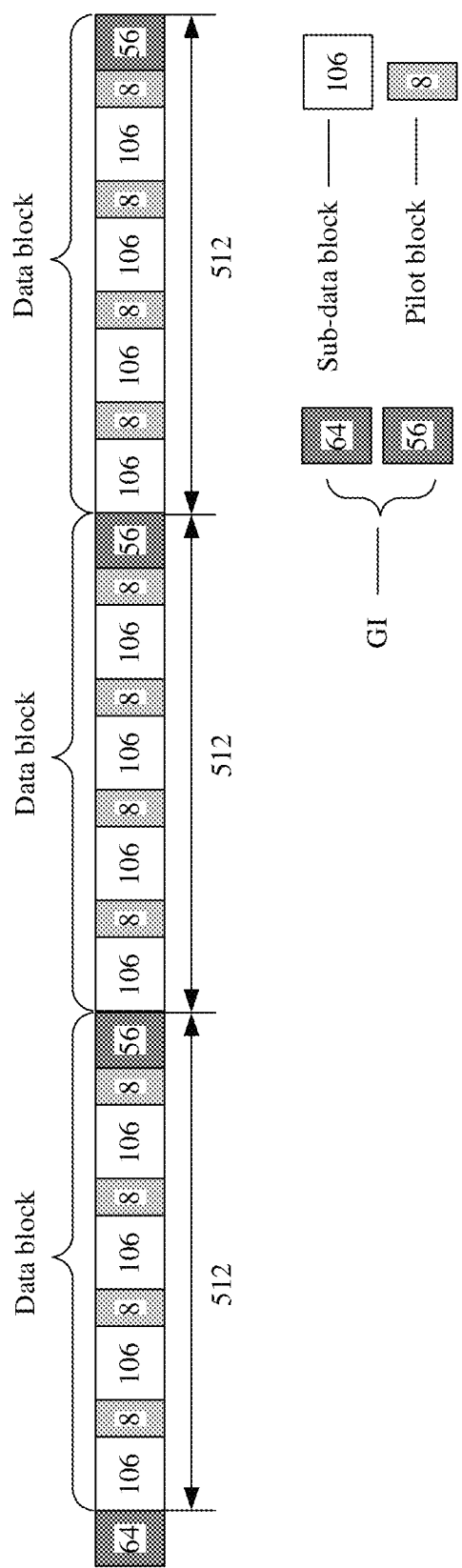
FIG. 10 is a schematic diagram of a format of another radio frame according to an embodiment of this application.

In a schematic diagram, shown in FIG. 10, of a format of the radio frame, the data block includes 512 time domain sampling points, the data block includes four pilot blocks, four sub-data blocks, and one GI, each pilot block includes eight pilots, each sub-data block includes 106 time domain sampling points, and the GI includes 56 time domain sampling points. In FIG. 10, in addition to including 64 time domain sampling points, a head-end GI of the radio frame may alternatively include another quantity of time domain sampling points, for example, may include 56 time domain sampling points. This is not limited in this application.

Example 4

Figure 11:
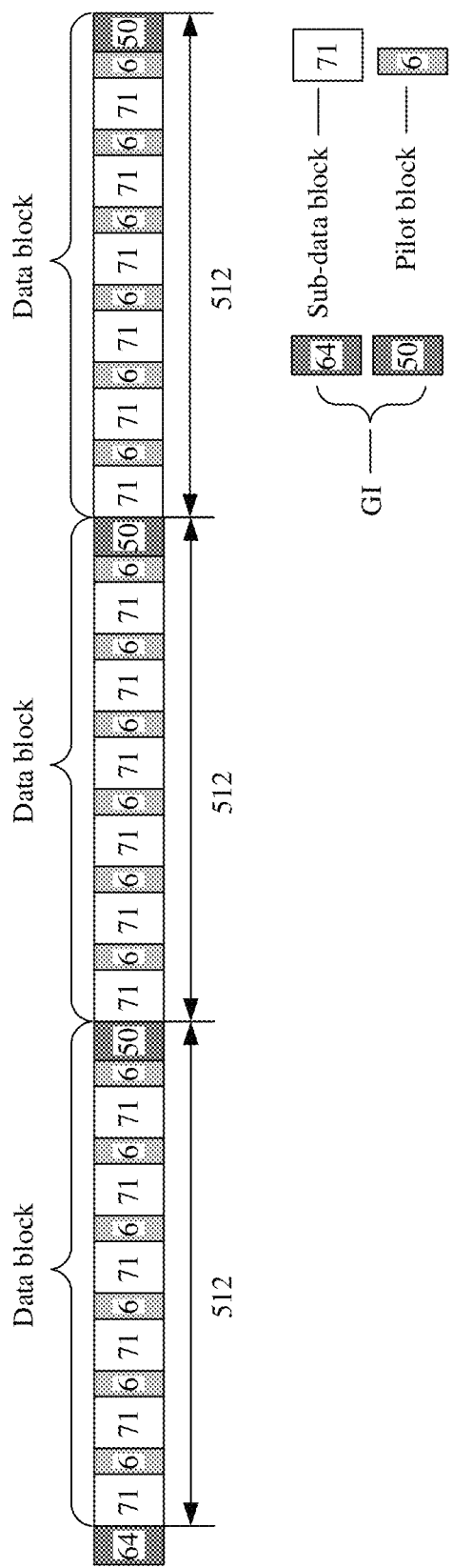
FIG. 11 is a schematic diagram of a format of another radio frame according to an embodiment of this application.

In a schematic diagram, shown in FIG. 11, of a format of the radio frame, the data block includes 512 time domain sampling points, the data block includes six pilot blocks, six sub-data blocks, and one GI, each pilot block includes six pilots, each sub-data block includes 71 time domain sampling points, and the GI includes 50 time domain sampling points. In FIG. 11, in addition to including 64 time domain sampling points, a head-end GI of the radio frame may alternatively include another quantity of time domain sampling points, for example, may include 50 time domain sampling points or 56 time domain sampling points. This is not limited in this application.

Example 5

Figure 12:
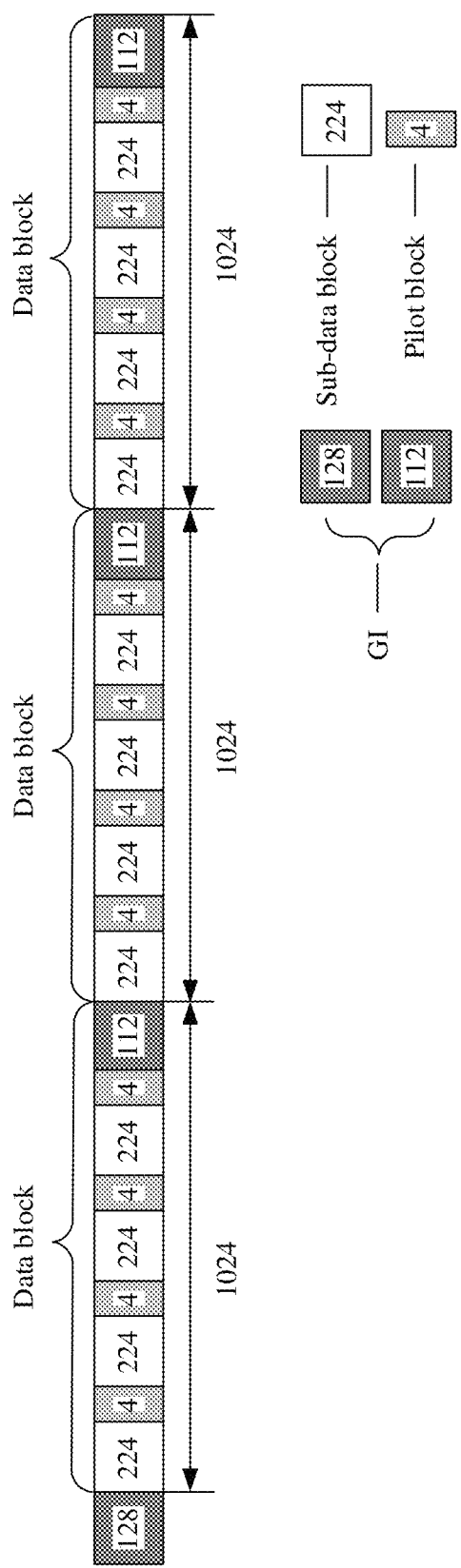
FIG. 12 is a schematic diagram of a format of another radio frame according to an embodiment of this application.

In a schematic diagram, shown in FIG. 12, of a format of the radio frame, the data block includes 1024 time domain sampling points, the data block includes four pilot blocks, four sub-data blocks, and one GI, each pilot block includes four pilots, each sub-data block includes 224 time domain sampling points, and the GI includes 112 time domain sampling points. In FIG. 12, in addition to including 128 time domain sampling points, a head-end GI of the radio frame may alternatively include another quantity of time domain sampling points, for example, may include 112 time domain sampling points or 116 time domain sampling points. This is not limited in this application.

Example 6

Figure 13:
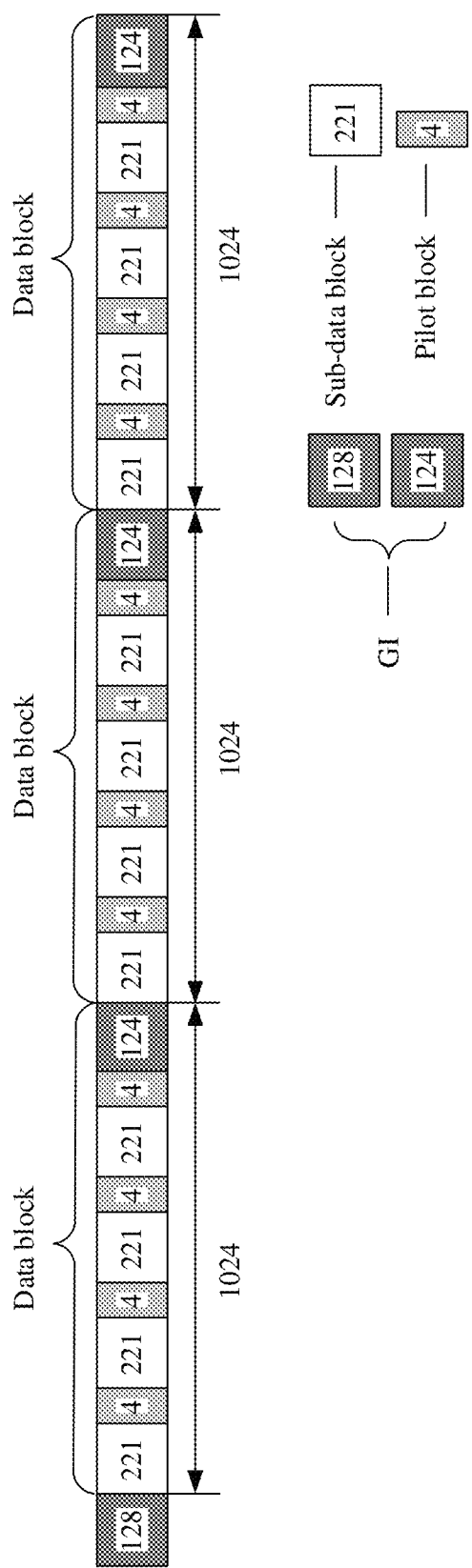
FIG. 13 is a schematic diagram of a format of another radio frame according to an embodiment of this application.

In a schematic diagram, shown in FIG. 13, of a format of the radio frame, the data block includes 1024 time domain sampling points, the data block includes four pilot blocks, four sub-data blocks, and one GI, each pilot block includes four pilots, each sub-data block includes 221 time domain sampling points, and the GI includes 124 time domain sampling points. In FIG. 13, in addition to including 128 time domain sampling points, a head-end GI of the radio frame may alternatively include another quantity of time domain sampling points, for example, may include 126 time domain sampling points. This is not limited in this application.

Example 7

Figure 14:
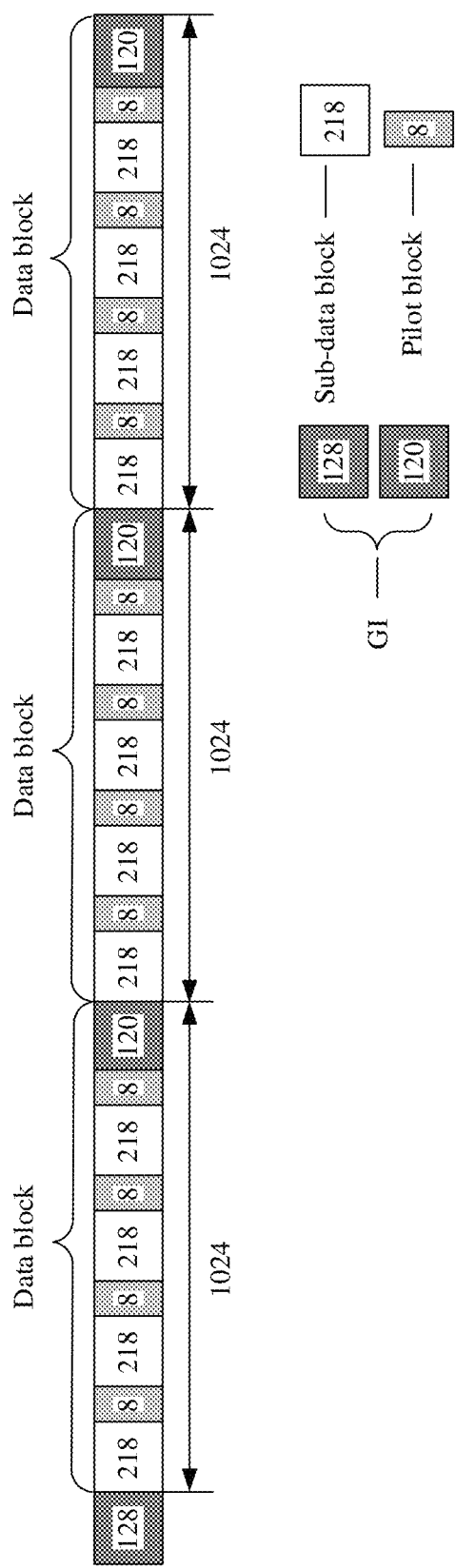
FIG. 14 is a schematic diagram of a format of another radio frame according to an embodiment of this application.

In a schematic diagram, shown in FIG. 14, of a format of the radio frame, the data block includes 1024 time domain sampling points, the data block includes four pilot blocks, four sub-data blocks, and one GI, each pilot block includes eight pilots, each sub-data block includes 218 time domain sampling points, and the GI includes 120 time domain sampling points. In FIG. 14, in addition to including 128 time domain sampling points, a head-end GI of the radio frame may alternatively include another quantity of time domain sampling points, for example, may include 120 time domain sampling points. This is not limited in this application.

Example 8

Figure 15:
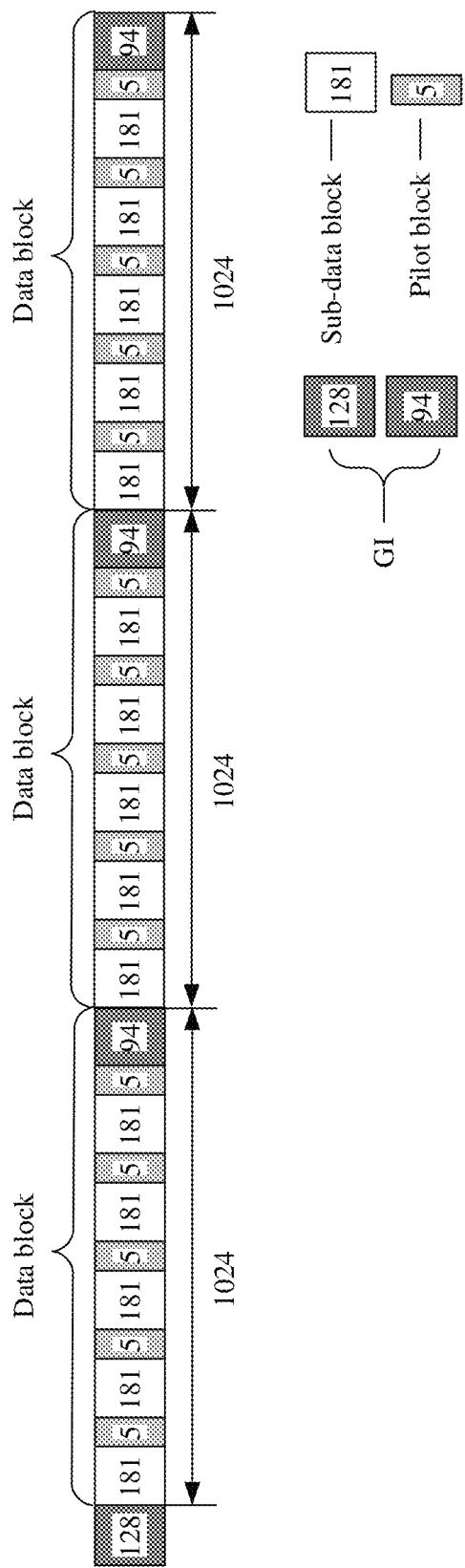
FIG. 15 is a schematic diagram of a format of another radio frame according to an embodiment of this application.

In a schematic diagram, shown in FIG. 15, of a format of the radio frame, the data block includes 1024 time domain sampling points, the data block includes five pilot blocks, five sub-data blocks, and one GI, each pilot block includes five pilots, each sub-data block includes 181 time domain sampling points, and the GI includes 94 time domain sampling points. In FIG. 15, in addition to including 128 time domain sampling points, a head-end GI of the radio frame may alternatively include another quantity of time domain sampling points, for example, may include 94 time domain sampling points or 99 time domain sampling points. This is not limited in this application.

Example 9

Figure 16:
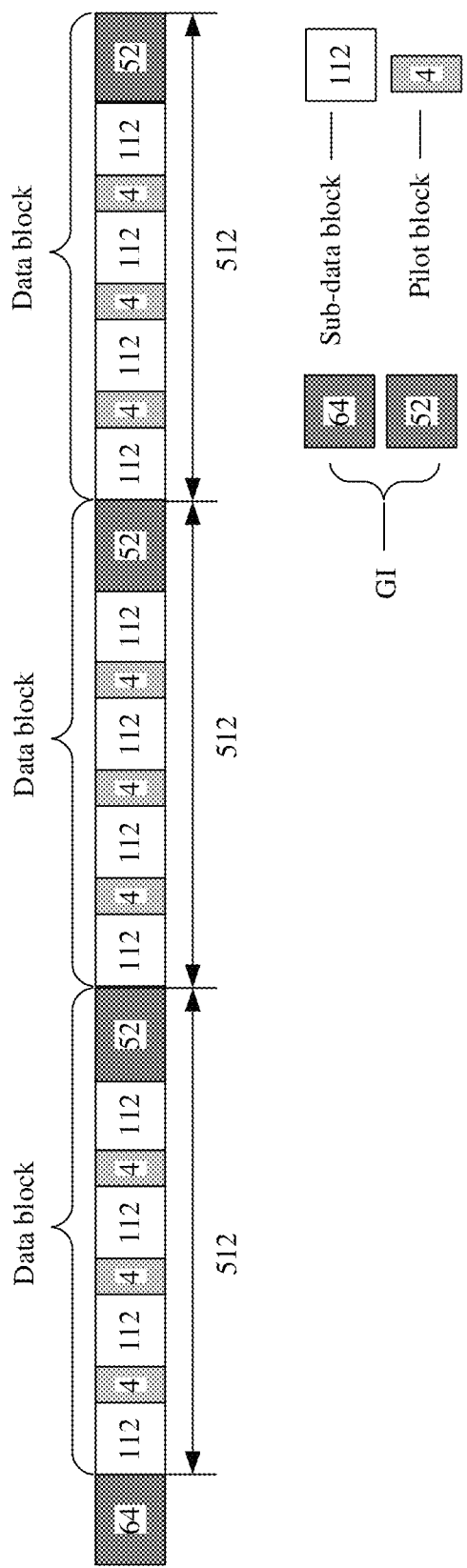
FIG. 16 is a schematic diagram of a format of another radio frame according to an embodiment of this application.

In a schematic diagram, shown in FIG. 16, of a format of the radio frame, the data block includes 512 time domain sampling points, the data block includes four sub-data blocks, three pilot blocks, and one GI, each pilot block includes four pilots, each sub-data block includes 112 time domain sampling points, and the GI includes 52 time domain sampling points. A quantity of time domain sampling points included in a head-end GI of the radio frame in FIG. 16 is similar to that in FIG. 8, and mutual reference may be made.

Example 10

Figure 17:
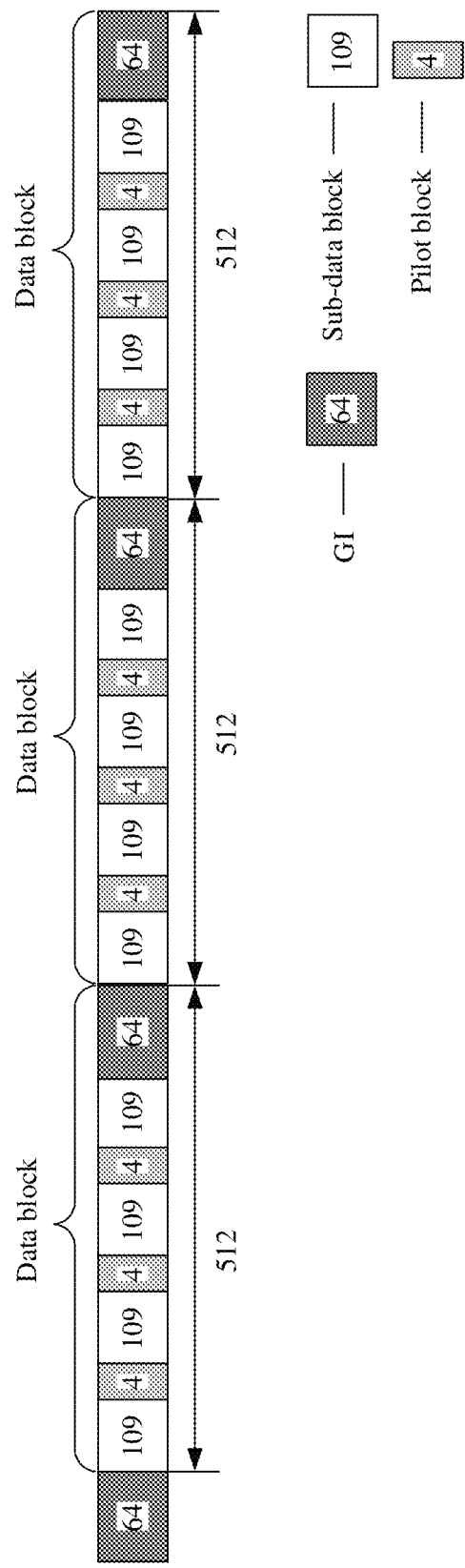
FIG. 17 is a schematic diagram of a format of another radio frame according to an embodiment of this application.

In a schematic diagram, shown in FIG. 17, of a format of the radio frame, the data block includes 512 time domain sampling points, the data block includes four sub-data blocks, three pilot blocks, and one GI, each pilot block includes four pilots, each sub-data block includes 109 time domain sampling points, and the GI includes 64 time domain sampling points. A quantity of time domain sampling points included in a head-end GI of the radio frame in FIG. 17 is similar to that in FIG. 9, and mutual reference may be made.

Example 11

Figure 18:
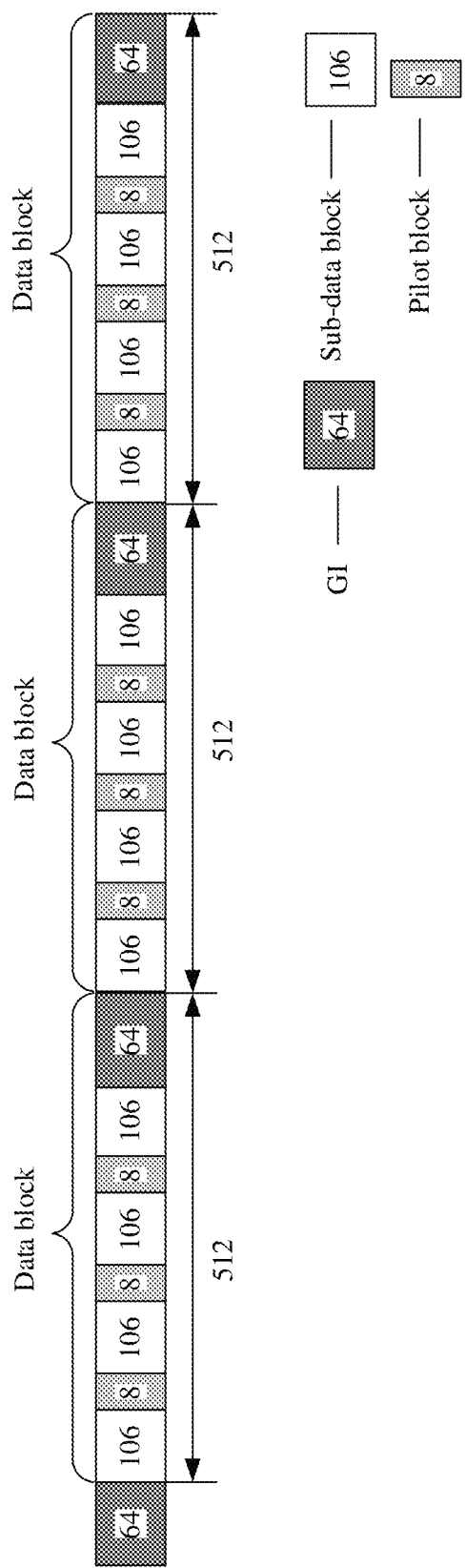
FIG. 18 is a schematic diagram of a format of another radio frame according to an embodiment of this application.

In a schematic diagram, shown in FIG. 18, of a format of the radio frame, the data block includes 512 time domain sampling points, the data block includes four sub-data blocks, three pilot blocks, and one GI, each pilot block includes eight pilots, each sub-data block includes 106 time domain sampling points, and the GI includes 64 time domain sampling points. A quantity of time domain sampling points included in a head-end GI of the radio frame in FIG. 18 is similar to that in FIG. 10, and mutual reference may be made.

Example 12

Figure 19:
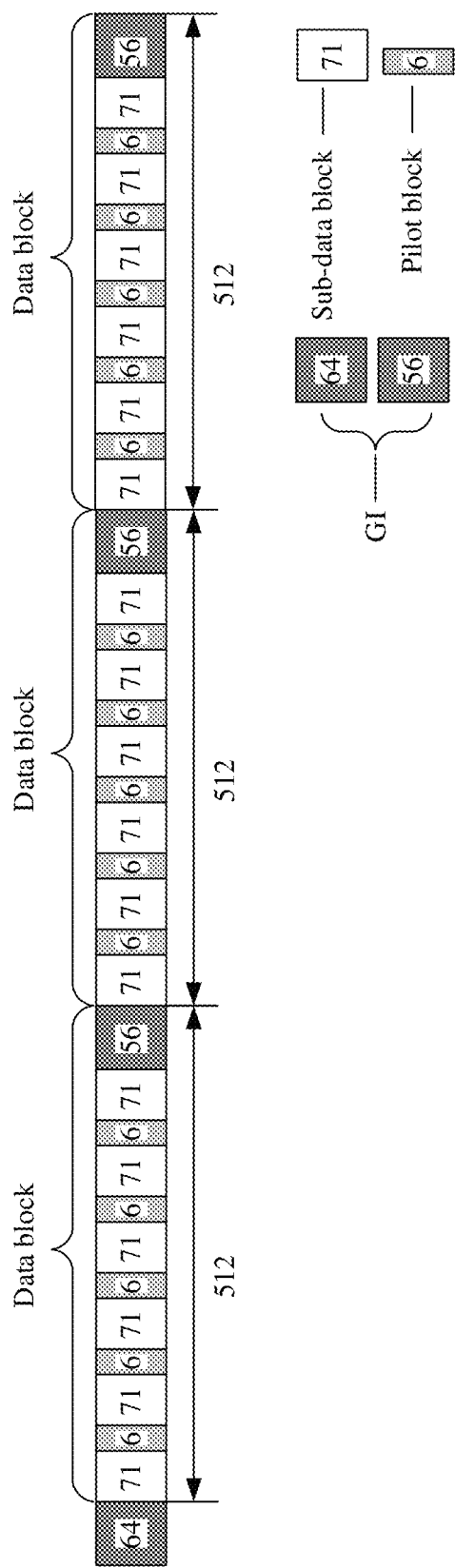
FIG. 19 is a schematic diagram of a format of another radio frame according to an embodiment of this application.

In a schematic diagram, shown in FIG. 19, of a format of the radio frame, the data block includes 512 time domain sampling points, the data block includes five pilot blocks, six sub-data blocks, and one GI, each pilot block includes six pilots, each sub-data block includes 71 time domain sampling points, and the GI includes 56 time domain sampling points. A quantity of time domain sampling points included in a head-end GI of the radio frame in FIG. 19 is similar to that in FIG. 11, and mutual reference may be made.

Example 13

Figure 20:
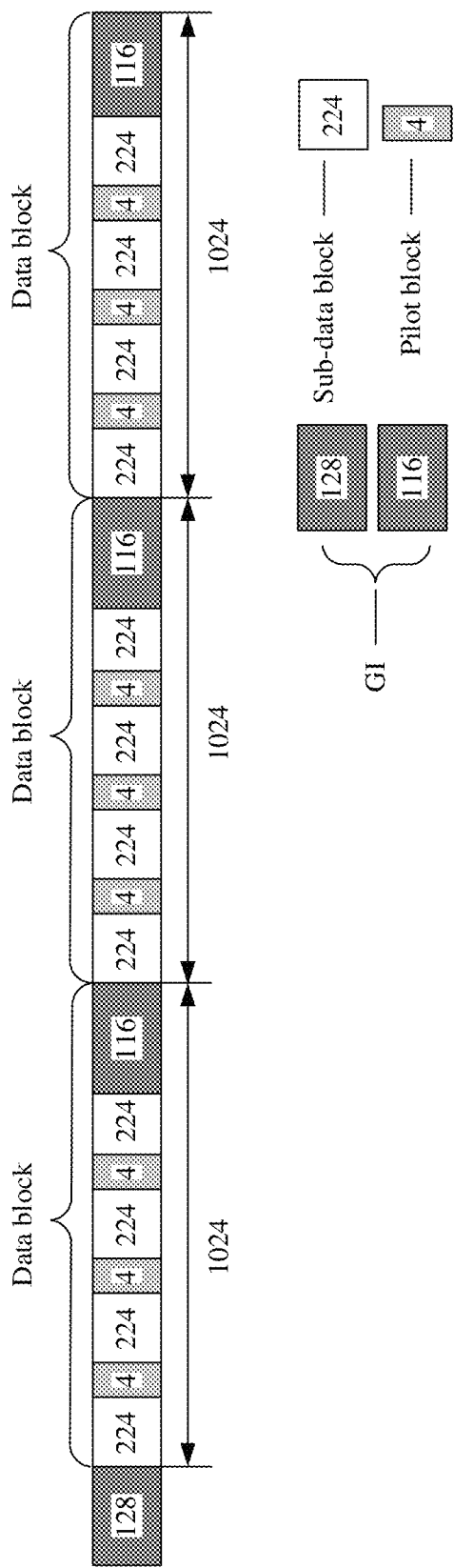
FIG. 20 is a schematic diagram of a format of another radio frame according to an embodiment of this application.

In a schematic diagram, shown in FIG. 20, of a format of the radio frame, the data block includes 1024 time domain sampling points, the any data block includes four sub-data blocks, three pilot blocks, and one GI, each pilot block includes four pilots, each sub-data block includes 224 time domain sampling points, and the GI includes 116 time domain sampling points. A quantity of time domain sampling points included in a head-end GI of the radio frame in FIG. 20 is similar to that in FIG. 12, and mutual reference may be made.

Example 14

Figure 21:
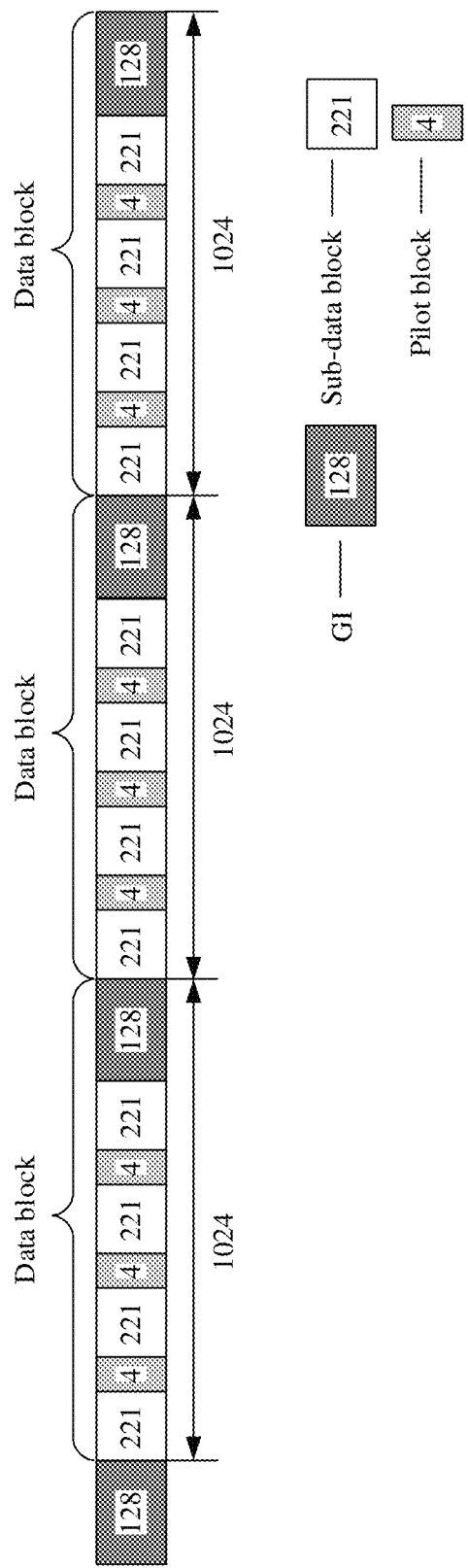
FIG. 21 is a schematic diagram of a format of another radio frame according to an embodiment of this application.

In a schematic diagram, shown in FIG. 21, of a format of the radio frame, the data block includes 1024 time domain sampling points, the any data block includes four sub-data blocks, three pilot blocks, and one GI, each pilot block includes four pilots, each sub-data block includes 221 time domain sampling points, and the GI includes 128 time domain sampling points. A quantity of time domain sampling points included in a head-end GI of the radio frame in FIG. 21 is similar to that in FIG. 13, and mutual reference may be made.

Example 15

Figure 22:
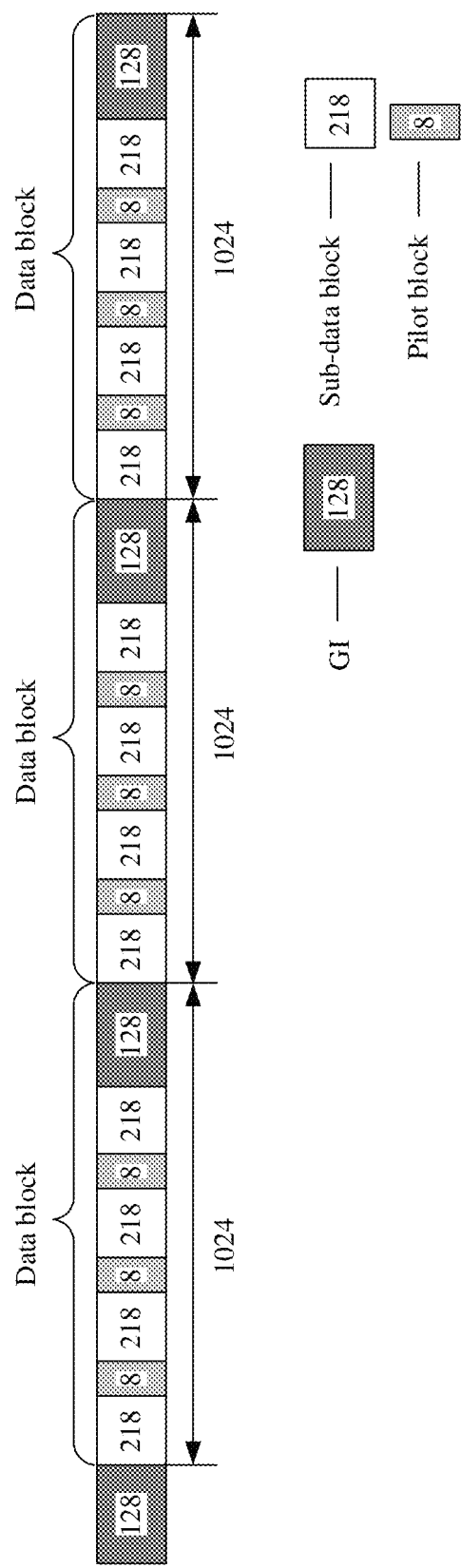
FIG. 22 is a schematic diagram of a format of another radio frame according to an embodiment of this application.

In a schematic diagram, shown in FIG. 22, of a format of the radio frame, the data block includes 1024 time domain sampling points, the any data block includes four sub-data blocks, three pilot blocks, and one GI, each pilot block includes eight pilots, each sub-data block includes 218 time domain sampling points, and the GI includes 128 time domain sampling points. A quantity of time domain sampling points included in a head-end GI of the radio frame in FIG. 22 is similar to that in FIG. 14, and mutual reference may be made.

Example 16

Figure 23:
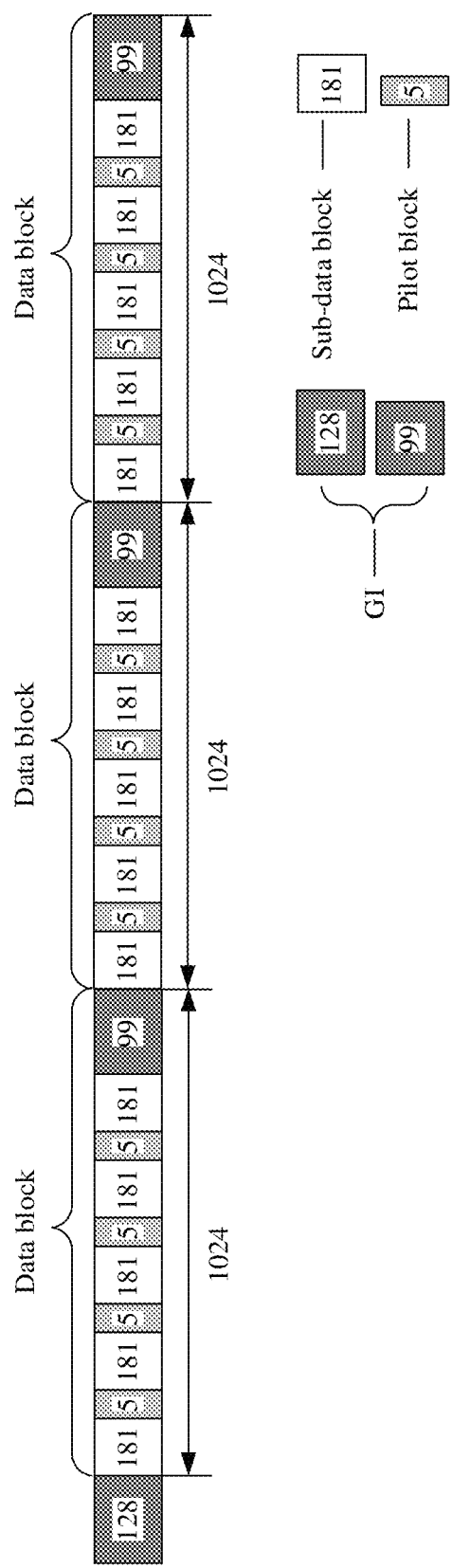
FIG. 23 is a schematic diagram of a format of another radio frame according to an embodiment of this application.

In a schematic diagram, shown in FIG. 23, of a format of the radio frame, the data block includes 1024 time domain sampling points, the data block includes four pilot blocks, five sub-data blocks, and one GI, each pilot block includes five pilots, each sub-data block includes 181 time domain sampling points, and the GI includes 99 time domain sampling points. A quantity of time domain sampling points included in a head-end GI of the radio frame in FIG. 23 is similar to that in FIG. 15, and mutual reference may be made.

It may be understood that the GI included in the data block in each of the foregoing example 1 to example 8 and a pilot block adjacent to the GI may be combined into an equivalent GI, and a quantity of time domain sampling points included in the combined equivalent GI corresponds to a quantity of time domain sampling points included in the GI included in the data block in each of the foregoing example 9 to example 16. For example, a quantity of time domain sampling points included in the GI included in the data block in the example 1 is 48, a pilot block adjacent to the GI includes four pilots, and a quantity of included time domain sampling points after the GI is combined with the pilot block adjacent to the GI is changed to 52. In this case, a combined block including the 52 time domain sampling points may be equivalent to the GI that is included in the data block in the example 9 and that includes 52 time domain sampling points, that is, the combined block is used as an equivalent GI. Therefore, it may be understood that when the GI in the data block is adjacent to a pilot block, the GI and the pilot block adjacent to the GI may be combined and considered as an equivalent GI, and the equivalent GI is used as a GI included in the data block.

It should be noted that only an example in which a quantity of pilot blocks is from 4 to 8 is described in the foregoing embodiment. However, it may be understood that when the quantity N of pilot blocks meets $4 \leq N \leq 8$, an effect of reducing the impact of the phase noise on the system performance is relatively prominent. However, when N is less than 4 or greater than 8, the impact of the phase noise on the system performance is also reduced compared with the current technology, and may be slightly reduced, that is, improvement is still made compared with the current technology. Therefore, the quantity N of pilot blocks may also be a value less than 4 or greater than 8. A principle is the same as that used when $4 \leq N \leq 8$. Details are not described herein in this application. Similarly, a quantity P of pilots included in each pilot block may also be a value less than 4 or greater than 8. Details are not described herein in this application.

According to the communication method provided in this embodiment of this application, the transmitter sends the radio frame to the receiver after generating the radio frame, and the receiver parses the radio frame after receiving the radio frame, so that wireless communication between the transmitter and the receiver is implemented. The radio frame includes a data block, and the data block includes N pilot blocks, M sub-data blocks, and one guard interval GI, where every two pilot blocks are not adjacent, the GI is located at a tail end of the data block, $4 \leq N \leq 8$ and N is an integer, and $M \geq N-1$ and M is an integer. According to the method, in data transmission of wireless communication, phase estimation and compensation may be performed by using pilot blocks at two ends of a sub-data block. In this way, a length of a sub-data block between two adjacent pilot blocks is small, and therefore the impact of the phase noise on the system performance may be reduced.

Figure 24:
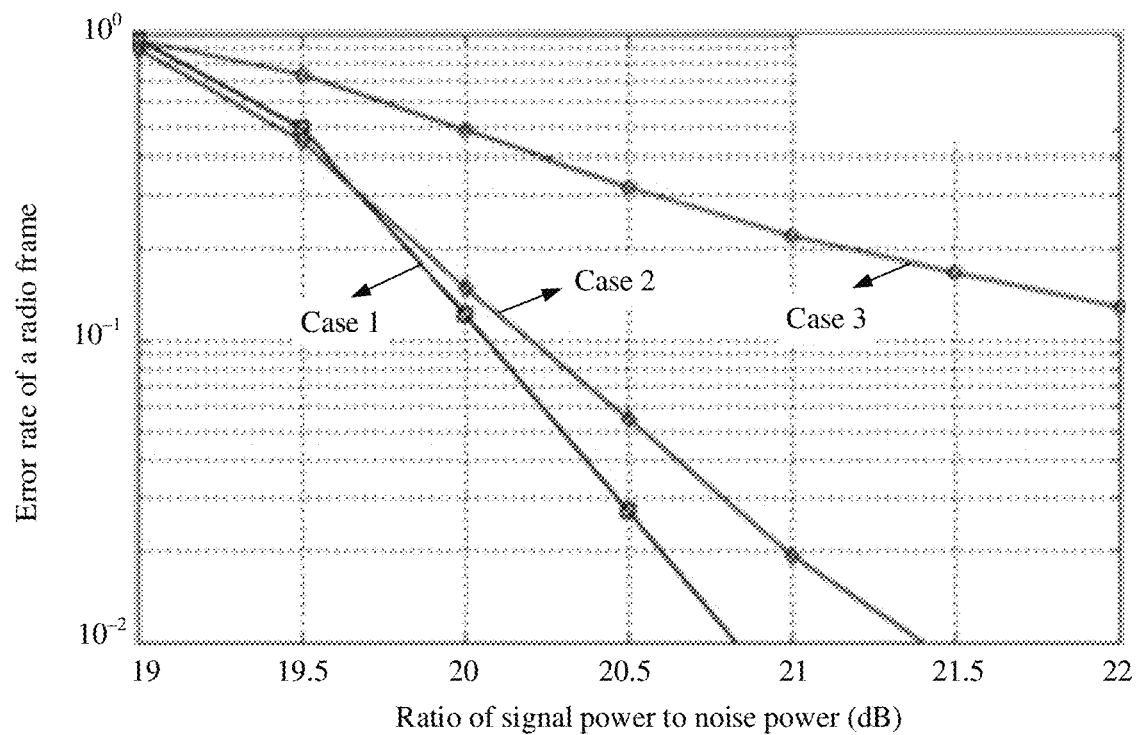
FIG. 24 is a schematic diagram of simulation effect analysis according to an embodiment of this application.

Based on the foregoing embodiment, the following simply compares impact of phase noise on system performance in different cases: a case in which a transmitter and a receiver perform wireless communication by using the format of the radio frame in the example 13 (for example, shown in a case 1 in FIG. 24), a case in which wireless communication is performed by using a format of a radio frame in the 802.11ad standard in the current technology (for example, shown in a case 2 in FIG. 24), and a case in which wireless communication is performed by using a format of a radio frame in the 802.11ay standard in the current technology (for example, shown in a case 3 in FIG. 24). The case 1 corresponds to the frame structure shown in FIG. 20 in the embodiments of this application. The case 2 corresponds to a frame structure in the 802.11ad in which one data block includes 512 time domain sampling points, where the data block includes one head-end GI (64 time domain sampling points), one sub-data block (448 time domain sampling points), and one tail-end GI (64 time domain sampling points). The case 3 corresponds to a frame structure in the 802.11ay in which one data block includes 1024 time domain sampling points, where the data block includes one head-end GI (128 time domain sampling points), one sub-data block (896 time domain sampling points), and one tail-end GI (128 time domain sampling points).

As shown in FIG. 24, it can be learned that, usually, when ratios of signal power to noise power are the same (for example, 20 decibels (dB) or 20.5 dB in the figure), an error rate of the radio frame in the case 1 is clearly lower than error rates of radio frames in the case 2 and the case 3. In other words, system performance in the case 1 is clearly better than system performance in the case 2 and the case 3. Therefore, it can be clearly learned from the foregoing comparison analysis that, compared with the current technology, the method provided in the embodiments of this application can reduce impact of phase noise on system performance.

Figure 25:
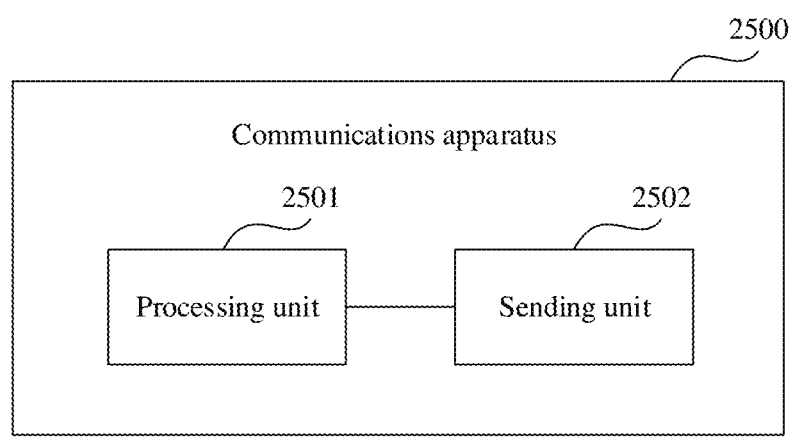
FIG. 25 is a schematic structural diagram of a communications apparatus according to an embodiment of this application.

Based on the foregoing embodiments, an embodiment of this application further provides a communications apparatus. The communications apparatus is used in a transmitter, may be used in an AP or a STA in the communications system shown in FIG. 1, and is configured to implement the communication method shown in FIG. 3. With reference to FIG. 25, the communications apparatus 2500 may include a processing unit 2501 and a sending unit 2502. The processing unit 2501 is configured to generate a radio frame, where the radio frame includes a data block, and the data block includes N pilot blocks, M sub-data blocks, and one guard interval GI, where every two pilot blocks are not adjacent, the GI is located at a tail end of the data block, $4 \leq N \leq 8$ and N is an integer, and $M \geq N-1$ and M is an integer. The sending unit 2502 is configured to send the radio frame to a receiver.

Figure 26:
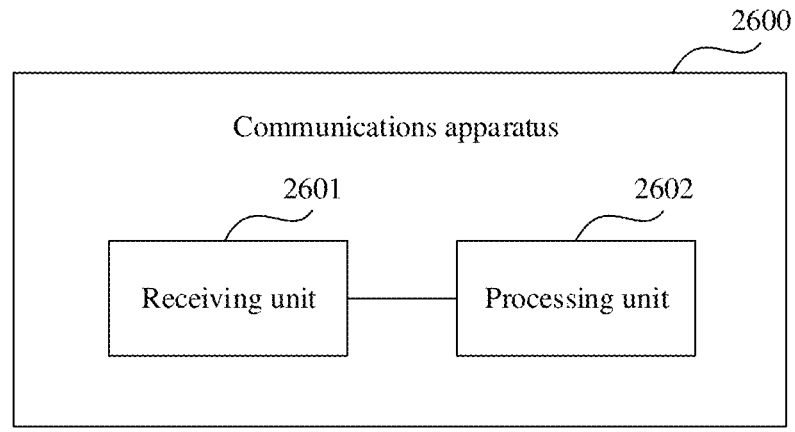
FIG. 26 is a schematic structural diagram of another communications apparatus according to an embodiment of this application.

Based on the foregoing embodiments, an embodiment of this application further provides another communications apparatus. The communications apparatus is used in a receiver, may be used in an AP or a STA in the communications system shown in FIG. 1, and is configured to implement the communication method shown in FIG. 3. With reference to FIG. 26, the communications apparatus 2600 may include a receiving unit 2601 and a processing unit 2602.

The receiving unit 2601 is configured to receive a radio frame from a transmitter, where the radio frame includes a data block, and the data block includes N pilot blocks, M sub-data blocks, and one guard interval GI, where every two of the N pilot blocks are not adjacent, the GI is located at a tail end of the data block, $4 \leq N \leq 8$ and N is an integer, and $M \geq N-1$ and M is an integer. The processing unit 2602 is configured to parse the radio frame.

In an optional implementation, each of the N pilot blocks related to the two communications apparatuses in FIG. 25 and FIG. 26 includes P pilots, where $4 \leq P \leq 8$ and P is an integer.

In a possible design, every two of the M sub-data blocks related to the two communications apparatuses in FIG. 25 and FIG. 26 are not adjacent.

In an optional manner, the N pilot blocks related to the two communications apparatuses in FIG. 25 and FIG. 26 have a same length.

In an optional manner, the M sub-data blocks related to the two communications apparatuses in FIG. 25 and FIG. 26 have a same length.

In a possible design, the data block related to the two communications apparatuses in FIG. 25 and FIG. 26 includes 512 time domain sampling points, and the data block includes four pilot blocks, four sub-data blocks, and one GI, where each pilot block includes four pilots, each sub-data block includes 112 time domain sampling points, and the GI includes 48 time domain sampling points; or each pilot block includes four pilots, each sub-data block includes 109 time domain sampling points, and the GI includes 60 time domain sampling points; or each pilot block includes eight pilots, each sub-data block includes 106 time domain sampling points, and the GI includes 56 time domain sampling points.

In another possible design, the data block related to the two communications apparatuses in FIG. 25 and FIG. 26 includes 1024 time domain sampling points, and the data block includes four pilot blocks, four sub-data blocks, and one GI, where each pilot block includes four pilots, each sub-data block includes 224 time domain sampling points, and the GI includes 112 time domain sampling points; or each pilot block includes four pilots, each sub-data block includes 221 time domain sampling points, and the GI includes 124 time domain sampling points; or each pilot block includes eight pilots, each sub-data block includes 218 time domain sampling points, and the GI includes 120 time domain sampling points.

In still another possible design, the data block related to the two communications apparatuses in FIG. 25 and FIG. 26 includes 512 time domain sampling points, and the data block includes four sub-data blocks, three pilot blocks, and one GI, where each pilot block includes four pilots, each sub-data block includes 112 time domain sampling points, and the GI includes 52 time domain sampling points; or each pilot block includes four pilots, each sub-data block includes 109 time domain sampling points, and the GI includes 64 time domain sampling points; or each pilot block includes eight pilots, each sub-data block includes 106 time domain sampling points, and the GI includes 64 time domain sampling points.

In still another possible design, the data block related to the two communications apparatuses in FIG. 25 and FIG. 26 includes 1024 time domain sampling points, and the data block includes four sub-data blocks, three pilot blocks, and one GI, where each pilot block includes four pilots, each sub-data block includes 224 time domain sampling points, and the GI includes 116 time domain sampling points; or each pilot block includes four pilots, each sub-data block includes 221 time domain sampling points, and the GI includes 128 time domain sampling points; or each pilot block includes eight pilots, each sub-data block includes 218 time domain sampling points, and the GI includes 128 time domain sampling points.

It should be noted that in the embodiments of this application, division into the units is an example, is merely logical function division, and may be other division during actual implementation. Function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) or a processor (processor) to perform all or some of the steps of the methods in the embodiments of this application. The storage medium includes any medium that can store program code, such as a USB flash drive, a removable hard disk, a read-only memory (ROM), a random access memory (RAM), a magnetic disk, or an optical disc.

Figure 27:
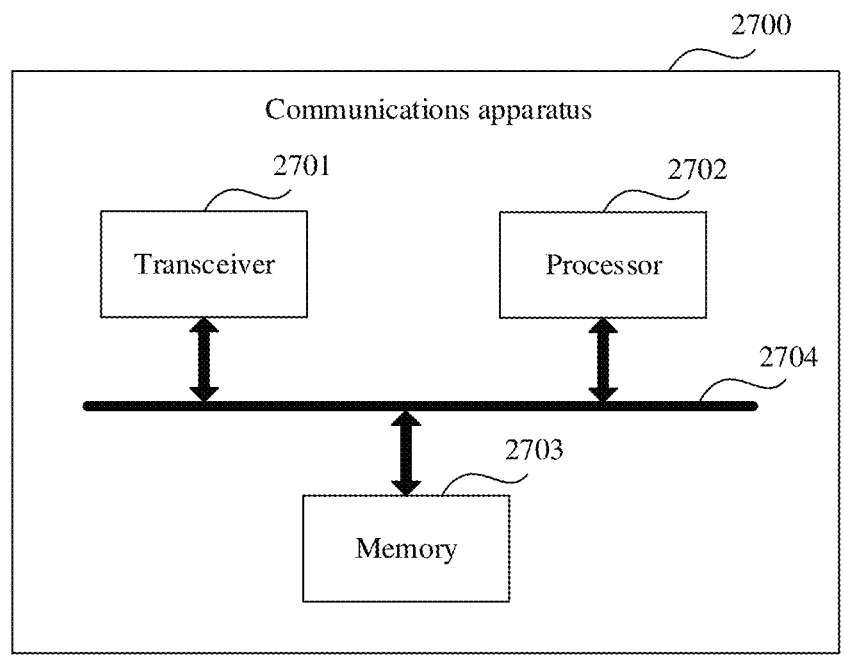
FIG. 27 is a structural diagram of a communications apparatus according to an embodiment of this application.

Based on the foregoing embodiments, an embodiment of this application further provides a communications apparatus. The communications apparatus is used in the communications system shown in FIG. 1, and is configured to implement the communication method shown in FIG. 3. With reference to FIG. 27, the communications apparatus 2700 may include a transceiver 2701 and a processor 2702. Optionally, the communications apparatus 2700 may further include a memory 2703. The processor 2702 may be a central processing unit (CPU), a network processor (NP), a combination of a CPU and an NP, or the like. The processor 2702 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The processor 2702 may implement the foregoing functions by hardware or certainly by hardware executing corresponding software.

The transceiver 2701 and the processor 2702 are connected to each other. Optionally, the transceiver 2701 and the processor 2702 are connected to each other through a bus 2704. The bus 2704 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 27, but this does not mean that there is only one bus or only one type of bus.

The memory 2703 is coupled to the processor 2702, and is configured to store a program and the like for the communications apparatus. For example, the program may include program code, and the program code includes a computer operation instruction. The memory 2703 may include a RAM, and may further include a non-volatile memory, for example, at least one magnetic disk memory. The processor 2702 executes an application program stored in the memory 2703, to implement a function of the communications apparatus.

In an embodiment, the communications apparatus shown in FIG. 27 may be configured to perform an operation of the transmitter in the embodiment shown in FIG. 3. For example, the processor 2702 is configured to generate a radio frame, where the radio frame includes a data block, and the data block includes N pilot blocks, M sub-data blocks, and one guard interval GI, where every two of the N pilot blocks are not adjacent, the GI is located at a tail end of the data block, $4 \leq N \leq 8$ and N is an integer, and $M \geq N-1$ and M is an integer; and the transceiver 2701 is configured to send the radio frame to a receiver.

In another embodiment, the communications apparatus shown in FIG. 27 may be configured to perform an operation of the receiver in the embodiment shown in FIG. 3. For example, the transceiver 2701 is configured to receive a radio frame from a transmitter, where the radio frame includes a data block, and the data block includes N pilot blocks, M sub-data blocks, and one guard interval GI, where every two of the N pilot blocks are not adjacent, the GI is located at a tail end of the data block, 4≤N≤8 and N is an integer, and M≥N−1 and M is an integer; and the processor 2702 is configured to parse the radio frame.

For example descriptions of the technical solutions in the communications apparatuses provided in this application, refer to related descriptions in the embodiment shown in FIG. 3. Details of repeated parts are not described.

In conclusion, the embodiments of this application provide the communication method and apparatus. In the method, the transmitter sends the radio frame to the receiver after generating the radio frame, and the receiver parses the radio frame after receiving the radio frame, so that wireless communication between the transmitter and the receiver is implemented. The radio frame includes a data block, and the data block includes N pilot blocks, M sub-data blocks, and one guard interval GI, where every two pilot blocks are not adjacent, the GI is located at a tail end of the data block, 4≤N≤8 and N is an integer, and M≥N−1 and M is an integer. According to the method, in data transmission of the wireless communication, phase estimation and compensation may be performed by using pilot blocks at two ends of a sub-data block. In this way, a length of a sub-data block between two adjacent pilot blocks is smaller than a length of a data block between two adjacent GIs in the current technology, and a phase error of an obtained data part may be reduced compared with the current technology. Therefore, the impact of the phase noise on the system performance may be reduced.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device, system, and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Clearly, a person skilled in the art can make various modifications and variations to the embodiments of this application without departing from the scope of the embodiments of this application. In this way, this application is intended to cover these modifications and variations of the embodiments of this application provided that they fall within the scope of protection defined by the following claims and their equivalent technologies.

What is claimed is:

1. A communications apparatus, comprising:
   a processor configured to generate a radio frame, wherein the radio frame comprises a data block, and the data block comprises a plurality of N pilot blocks, a plurality of M sub-data blocks, and one guard interval (GI), wherein every two N pilot blocks of the plurality of N pilot blocks are not adjacent, the one GI is located at a tail end of the data block, 3≤N≤8, N is an integer, M≥N−1, and M is an integer; and
   a transceiver configured to send the radio frame to a receiver,
   wherein the one GI comprises a plurality of time domain sampling points.

2. The apparatus according to claim 1, wherein each of the N pilot blocks comprises P pilots, 4≤P≤8, P is an integer.

3. The apparatus according to claim 1, wherein every two M sub-data blocks of the plurality of M sub-data blocks are not adjacent.

4. The apparatus according to claim 1, wherein the N pilot blocks have a same length.

5. The apparatus according to claim 1, wherein the M sub-data blocks have a same length.

6. The apparatus according to claim 1, wherein
   the data block comprises 512 time domain sampling points, N=4, M=4, and the one GI, and
   each pilot block comprises four pilots, each sub-data block comprises 112 time domain sampling points, and the one GI comprises 48 time domain sampling points; or
   each pilot block comprises four pilots, each sub-data block comprises 109 time domain sampling points, and the one GI comprises 60 time domain sampling points; or
   each pilot block comprises eight pilots, each sub-data block comprises 106 time domain sampling points, and the one GI comprises 56 time domain sampling points.

7. The apparatus according to claim 1, wherein
   the data block comprises 1024 time domain sampling points, N=4, M=4 and the one GI, and
   each pilot block comprises four pilots, each sub-data block comprises 224 time domain sampling points, and the one GI comprises 112 time domain sampling points; or each pilot block comprises four pilots, each sub-data block comprises 221 time domain sampling points, and the one GI comprises 124 time domain sampling points; or each pilot block comprises eight pilots, each sub-data block comprises 218 time domain sampling points, and the one GI comprises 120 time domain sampling points.

8. The apparatus according to claim 1, wherein
the data block comprises 512 time domain sampling points, N=3, M=4 and the one GI, and
each pilot block comprises four pilots, each sub-data block comprises 112 time domain sampling points, and the one GI comprises 52 time domain sampling points; or
each pilot block comprises four pilots, each sub-data block comprises 109 time domain sampling points, and the one GI comprises 64 time domain sampling points; or
each pilot block comprises eight pilots, each sub-data block comprises 106 time domain sampling points, and the one GI comprises 64 time domain sampling points.

9. The apparatus according to claim 1, wherein
the data block comprises 1024 time domain sampling points, N=3, M=4, and the one GI, and
each pilot block comprises four pilots, each sub-data block comprises 224 time domain sampling points, and the one GI comprises 116 time domain sampling points; or
each pilot block comprises four pilots, each sub-data block comprises 221 time domain sampling points, and the one GI comprises 128 time domain sampling points; or
each pilot block comprises eight pilots, each sub-data block comprises 218 time domain sampling points, and the one GI comprises 128 time domain sampling points.

10. A communications apparatus, comprising:
a transceiver, configured to receive a radio frame from a transmitter, wherein the radio frame comprises a data block, and the data block comprises a plurality of N pilot blocks, a plurality of M sub-data blocks, and one guard interval (GI), wherein every two N pilot blocks of the plurality of N pilot blocks are not adjacent, the GI is located at a tail end of the data block, 3≤N≤8, N is an integer, M≥N−1, and M is an integer; and
a processor configured to parse the radio frame,
wherein the one GI comprises a plurality of time domain sampling points.

11. The apparatus according to claim 10, wherein each of the N pilot blocks comprises P pilots, 4≤P≤8, and P is an integer.

12. The apparatus according to claim 10, wherein every two M sub-data blocks of the plurality of M sub-data blocks are not adjacent.

13. The apparatus according to claim 10, wherein the N pilot blocks have a same length.

14. The apparatus according to claim 10, wherein the M sub-data blocks have a same length.

15. The apparatus according to claim 10, wherein
the data block comprises 512 time domain sampling points, N=4, M=4, and the one GI, and
each pilot block comprises four pilots, each sub-data block comprises 112 time domain sampling points, and the one GI comprises 48 time domain sampling points; or
each pilot block comprises four pilots, each sub-data block comprises 109 time domain sampling points, and the one GI comprises 60 time domain sampling points; or
each pilot block comprises eight pilots, each sub-data block comprises 106 time domain sampling points, and the one GI comprises 56 time domain sampling points.

16. The apparatus according to claim 10, wherein
the data block comprises 1024 time domain sampling points, N=4, M=4, and the one GI, and
each pilot block comprises four pilots, each sub-data block comprises 224 time domain sampling points, and the one GI comprises 112 time domain sampling points; or
each pilot block comprises four pilots, each sub-data block comprises 221 time domain sampling points, and the one GI comprises 124 time domain sampling points; or
each pilot block comprises eight pilots, each sub-data block comprises 218 time domain sampling points, and the one GI comprises 120 time domain sampling points.

17. The apparatus according to claim 10, wherein
the data block comprises 512 time domain sampling points, N=3, M=4, and the one GI, and
each pilot block comprises four pilots, each sub-data block comprises 112 time domain sampling points, and the one GI comprises 52 time domain sampling points; or
each pilot block comprises four pilots, each sub-data block comprises 109 time domain sampling points, and the one GI comprises 64 time domain sampling points; or
each pilot block comprises eight pilots, each sub-data block comprises 106 time domain sampling points, and the one GI comprises 64 time domain sampling points.

18. The apparatus according to claim 10, wherein
the data block comprises 1024 time domain sampling points, N=3, M=4, and the one GI, and
each pilot block comprises four pilots, each sub-data block comprises 224 time domain sampling points, and the one GI comprises 116 time domain sampling points; or
each pilot block comprises four pilots, each sub-data block comprises 221 time domain sampling points, and the one GI comprises 128 time domain sampling points; or
each pilot block comprises eight pilots, each sub-data block comprises 218 time domain sampling points, and the one GI comprises 128 time domain sampling points.

19. A communication method, comprising:
generating, by a transmitter, a radio frame, wherein the radio frame comprises a data block, and the data block comprises a plurality of N pilot blocks, a plurality of M sub-data blocks, and one guard interval (GI), wherein every two N pilot blocks of the plurality of N pilot blocks are not adjacent, the GI is located at a tail end of the data block, 3≤N≤8, N is an integer, M≥N−1, and M is an integer; and
sending, by the transmitter, the radio frame to a receiver, wherein the one GI comprises a plurality of time domain sampling points.

20. The communication method according to claim 19, wherein each of the N pilot blocks comprises P pilots, 4≤P≤8, and P is an integer.

* * * * *